United States Patent [19]

Andersson et al.

[11] Patent Number: 5,687,779
[45] Date of Patent: Nov. 18, 1997

[54] PACKAGING MACHINE SYSTEM FOR FILLING PRIMARY AND SECONDARY PRODUCTS INTO A CONTAINER

[75] Inventors: Sven Arne Andersson, Veberöd; Lars Brunndahl, Lund, both of Sweden; Arde Kirka, Algonquin; Michael Wagner, Elmhurst, both of Ill.; Karl-Gunnar Axelsson, Ayios Dometios, Cyprus

[73] Assignee: Tetra Laval Holdings & Finance S.A., Pully, Switzerland

[21] Appl. No.: 753,995

[22] Filed: Dec. 4, 1996

Related U.S. Application Data

[63] Continuation of Ser. No. 315,246, Sep. 29, 1994, abandoned, which is a continuation-in-part of Ser. No. 392,854, Apr. 13, 1995.

[30] Foreign Application Priority Data

Sep. 17, 1992 [SE] Sweden .................. 9202689

[51] Int. Cl.$^6$ .................. A23C 9/14
[52] U.S. Cl. .................. 141/105; 141/9; 141/82; 141/392; 141/90; 426/586
[58] Field of Search .................. 141/9, 82, 90, 141/91, 104–107, 392; 53/237, 474; 426/586

[56] References Cited

U.S. PATENT DOCUMENTS

| | | |
|---|---|---|
| 2,099,252 | 11/1937 | Bagby . |
| 2,613,023 | 10/1952 | Reich .................. 53/474 |
| 3,097,764 | 7/1963 | Loeser . |
| 3,229,477 | 1/1966 | Erickson . |
| 3,267,971 | 8/1966 | Mueller .................. 141/9 |
| 3,298,383 | 1/1967 | Cooper . |
| 3,474,965 | 10/1969 | Coleman . |
| 3,643,679 | 2/1972 | Hansson .................. 137/241 |
| 3,770,208 | 11/1973 | Mueller . |

(List continued on next page.)

FOREIGN PATENT DOCUMENTS

| | | |
|---|---|---|
| 0 117 329 | 12/1984 | European Pat. Off. . |
| 0 155 736 | 9/1985 | European Pat. Off. . |
| 0 170 209 | 2/1986 | European Pat. Off. . |
| 0 170 209 A3 | 2/1986 | European Pat. Off. . |
| 0 280 537 | 8/1988 | European Pat. Off. . |
| 0 280 537 A1 | 8/1988 | European Pat. Off. . |
| 0 191 192 B1 | 3/1990 | European Pat. Off. . |
| 0 515 077 | 11/1992 | European Pat. Off. . |
| 1 611 885 | 6/1972 | Germany . |
| PCT/SE93/ 00753 | 3/1994 | WIPO . |

*Primary Examiner*—J. Casimer Jacyna
*Attorney, Agent, or Firm*—McAndrews, Held & Malloy, Ltd.; Michael A. Catania

[57] ABSTRACT

A fill system for use in a packaging machine is disclosed for filling a container with a primary and a secondary product. The fill system includes a primary pump system for pumping a predetermined amount of the primary product received at an inlet thereof to an outlet thereof. A primary fill pipe having an outlet overlying a container processing path along which the containers are filled and sealed by the packaging machine is connected to receive the predetermined amount of primary product from the outlet of the primary pump system. The container processing path lies generally perpendicular to the primary fill pipe. A nozzle is connected at the outlet of the fill pipe. The fill system further includes a secondary pump system for pumping a predetermined amount of the secondary product received at an inlet thereof to an outlet thereof. A secondary fill pipe is connected to receive the predetermined amount of secondary product from the outlet of the secondary pump means. The secondary fill pipe is concentrically disposed in the primary fill pipe and has an outlet that likewise overlies the container processing path. A valve mechanism is disposed, for example, concentrically within the secondary fill pipe and includes a sealing member positioned at the outlet of the secondary fill pipe. The sealing member is operable to control the flow of the secondary product from the secondary fill pipe. Operation of the fill system may be user controlled by a user interface and control system.

34 Claims, 31 Drawing Sheets

U.S. PATENT DOCUMENTS

| | | | |
|---|---|---|---|
| 3,908,719 | 9/1975 | Berg et al. | 141/82 |
| 4,018,362 | 4/1977 | Ubaud | 222/55 |
| 4,275,822 | 6/1981 | Juffa et al. | 222/63 |
| 4,475,666 | 10/1984 | Bilbrey et al. | 222/14 |
| 4,494,677 | 1/1985 | Falcoff | 222/63 |
| 4,513,796 | 4/1985 | Miller et al. | 141/100 X |
| 4,635,825 | 1/1987 | Tulasne . | |
| 4,789,100 | 12/1988 | Senf . | |
| 4,887,857 | 12/1989 | Van Ommeren | 141/82 X |
| 4,913,185 | 4/1990 | Mattei | 137/241 |
| 4,964,444 | 10/1990 | Hanerus et al. | 141/90 |
| 4,966,205 | 10/1990 | Tanaka | 141/9 |
| 5,009,339 | 4/1991 | Hanerus et al. | 222/1 |
| 5,040,699 | 8/1991 | Gangemi | 141/105 X |
| 5,133,391 | 7/1992 | Johansson et al. | 141/9 X |
| 5,179,970 | 1/1993 | Jarocki et al. . | |
| 5,213,140 | 5/1993 | Miscevic et al. | 141/9 |
| 5,339,875 | 8/1994 | English et al. | 141/9 |

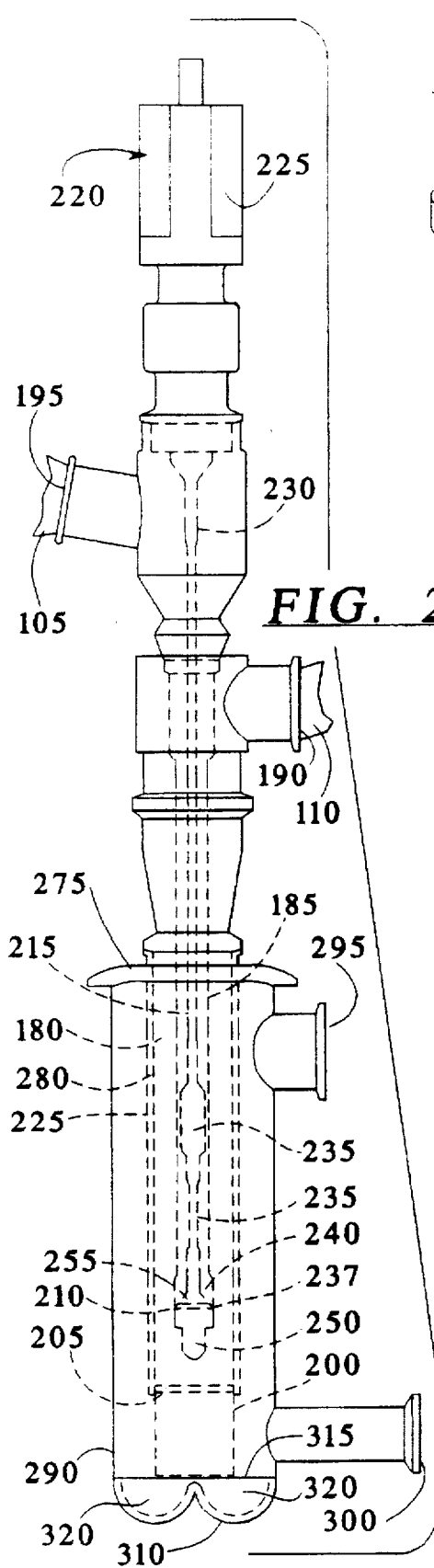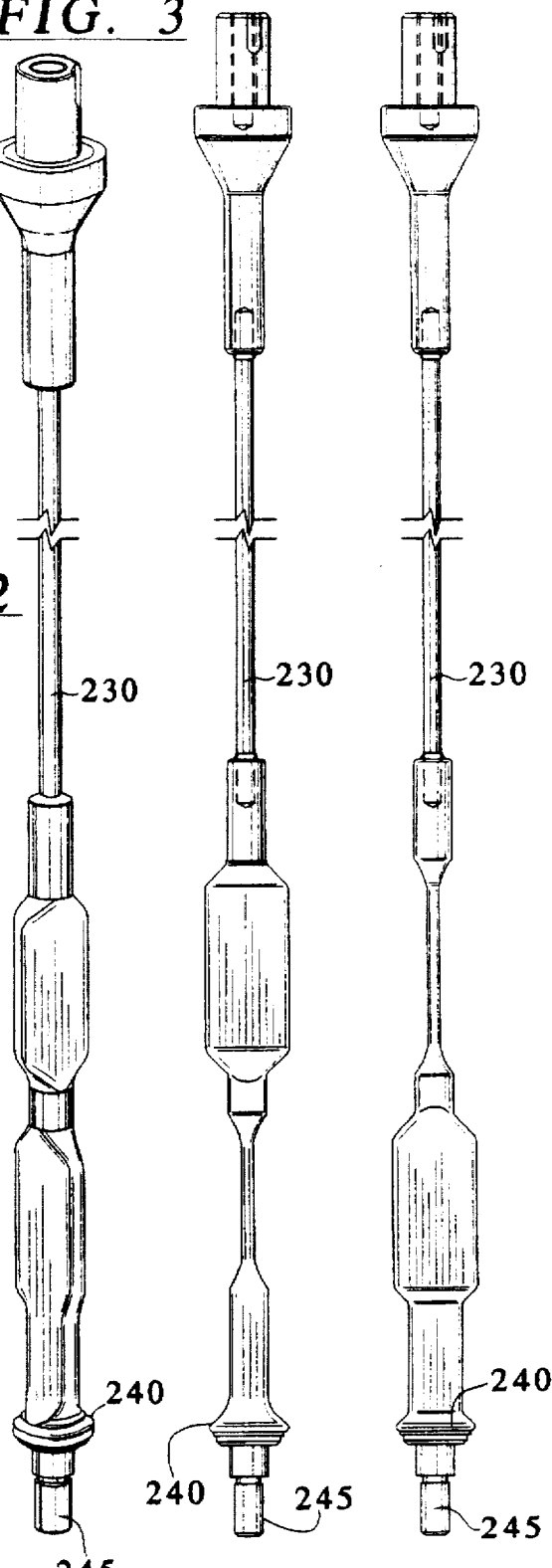

PRODUCTION FILLING

RINSING STEP 3

FILLING UP STEP 3

DRAINING
PRIMARY PRODUCT

DRAINING
SECONDARY PRODUCT

SANITIZATION

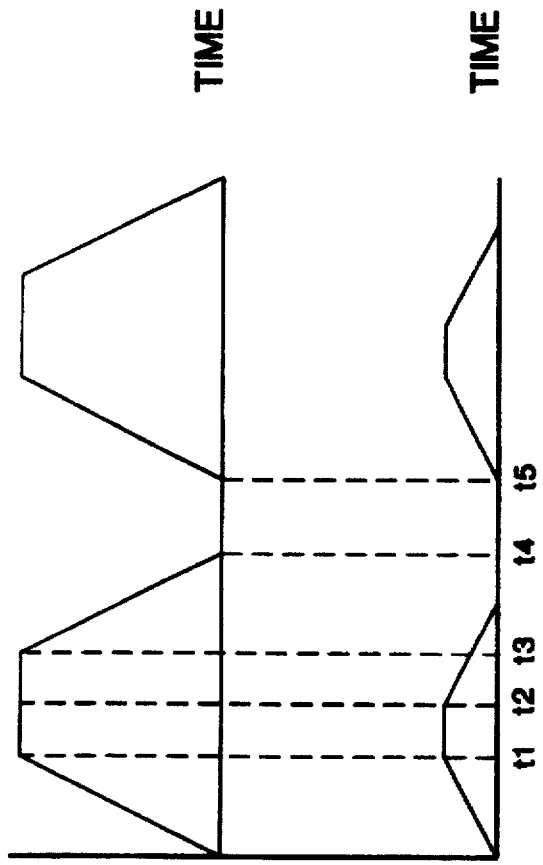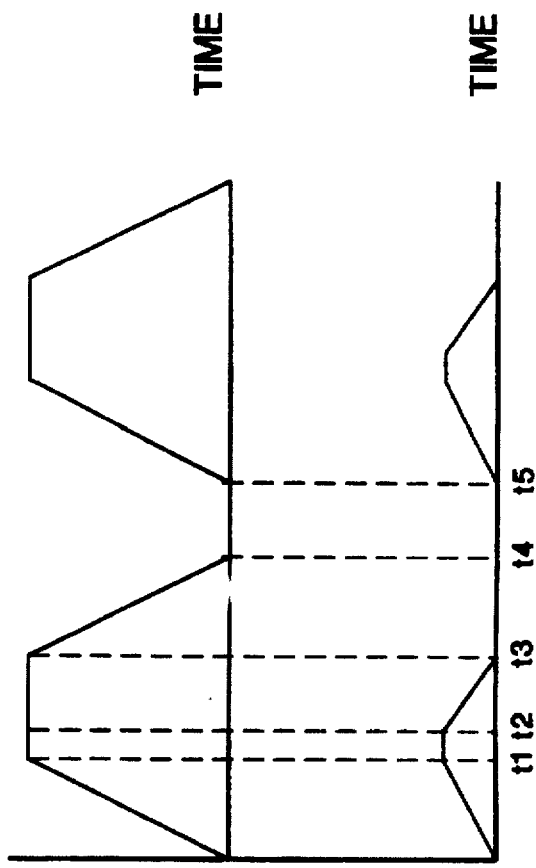

5,687,779

PACKAGING MACHINE SYSTEM FOR FILLING PRIMARY AND SECONDARY PRODUCTS INTO A CONTAINER

This application is a continuation application of U.S. Ser. No. 08/315,246, filed Sep. 24, 1994, abandoned, which is a continuation-in-part application of U.S. Ser. No. 08/392,854, filed Apr. 13, 1995, and still pending, which claims priority from PCT International Application No. PCT/SE93/00753, having an international filing date of Sep. 16, 1993, and designating the U.S. as one of the designated countries which claims priority from Swedish Patent Application Ser. No. 9202689-7, filed Sep. 17, 1992.

FIELD OF THE INVENTION

The present invention relates to a filling system for use in a packaging machine. More particularly, the present invention relates a filling system for filling a primary product and a secondary product into a container as it is transported along the processing path of a packaging machine and wherein the primary product may be skim milk and the secondary product may be

BACKGROUND OF THE INVENTION

There are a number of milk products with different fat contents on the market today. In the U.S., for example, skim milk, 1% Milkfat, 2% Milkfat, and whole milk are available. Abroad in Sweden there are, for example, minimum milk with 0.1% fat, light milk with 0.5% fat, "middle" milk with 1.5% fat, and "standard" milk with 3.0% fat. Government regulations dictate that the fat content given on the packages must be accurate. Therefore, the production of milk with a certain, guaranteed fat content, usually called standardization of milk, is an important process step in a dairy.

The standardization process has traditionally been carded out according to two different general methods: batch standardization in tanks or direct in-line standardization. The first step of each of these methods is to separate whole milk into cream and skim milk. The term "whole" milk or raw milk is used for milk as it is delivered to the dairies with a fat content around 4%.

When using batch standardization two methods are used—pre-standardization and post-standardization. In pre-standardization, the milk is standardized prior to pasteurization. When the milk is standardized to a fat content higher than the fat content in the raw milk, cream is mixed with the milk in proportions which provide the desired fat content. If the standardization takes place lowers the fat content, the raw milk is diluted with skim milk. The standardized milk is pasteurized after analysis of the fat content and any corrections necessary to assure an accurate fat content.

In post-standardization, pasteurized milk is mixed with cream or skim milk depending on whether the fat content is to be adjusted upwards or downwards in the same way as is practiced for the pre-standardization. Some risks for re-infection are present, however, since post-standardization involves mixing products that have already been pasteurized.

Both pre-standardization and post-standardization methods require large tanks. Further, analysis of the resulting milk and a possible correction of the fat content is labor-intensive.

The second general method, direct-standardization, has therefore been an attractive alternative for many years. According to this method, the fat content is adjusted to the required level by remixing a certain amount of the cream obtained from the separator with skim milk also obtained from the centrifugal separator. This remixing takes place in the skim milk pipeline connected to the skim milk outlet from the centrifugal separator.

The pasteurization usually takes place in connection with the standardization. Whole milk is preheated to a temperature suitable for the separation of the cream from the skim milk. The standardized milk that is obtained after the remixing of suitable amounts of cream and skim milk after passage of the centrifugal separator is then heated and pasteurized.

The methods described above are used for manufacture of milk with a preselected fat content. A desired amount of milk is produced. If milk with another fat content should be produced, the system must be adjusted to new preset values and volumes.

The different milk products with a varying fat content mentioned above may be produced by in-line standardization. The packaging does not take place immediately after the standardization but the milk products are intermediately stored in large tanks in the dairy. Usually, different kinds of consumer milk are packaged firstly when the distributors working on the market have delivered their orders for a suitable amount of packages of consumer milk with differing fat content.

During decades of development, manufacturers of packaging machines have devised a variety of ways to form, fill and seal containers, such as gable top cartons, with milk and other liquids stored in the large tanks. Today, the most prevalent packaging machines for gable top cartons are adapted to receive the carton blank after it has been side sealed. The process of side sealing involves sealing opposite vertical edges of the carton blank together to form a polygonal (usually rectangular) sleeve. The sleeve is received on an indexable mandrel wheel which rotates the sleeve into respective positions where the end of the sleeve extending outwardly from the mandrel is folded and sealed to form the bottom of the carton.

After the carton bottom has been formed, it is removed from the mandrel and transported along a processing path to a filling station. There, the carton is filled from a storage tank that, for example, contains the standardized and pasteurized milk. Filling takes place through a single fill tube and nozzle. Once the carton has been filled, the top of the carton is folded into the familiar gable top configuration and is heat sealed, thus completing the packaging process. One example of a known packaging machine that operates generally in accordance with these principles is described in U.S. Pat. No. 3,789,746 to Martensson et al. Additional features of such machines are disclosed in U.S. Pat. Nos.: 5,161,938; 5,011,467; 5,009,339; 4,979,728; 4,964,444; 4,861,328; 4,783,088; 4,759,171; and 4,493,687. All of the foregoing patents are hereby incorporated by reference.

Trends within the field of packaging machines point toward increasingly high capacity machines intended for rapid, continuous filling and sealing of a very large number of identical or similar packaging containers, e.g., such as containers of the type intended for liquid contents such as milk, juice, and the like. The filling system of the packaging machine is important to the throughput and size of the machine since it is generally bulky and filling is often a slow process. Additionally, rapid transition between different container contents, such as milk of varying milkfat concentrations, is often difficult and labor intensive. Further labor intensive mixing steps may precede the filling of the storage tanks where the container contents include a primary and secondary product that are mixed together to form the final product. Accordingly, it is desirable to provide a filling system for a packaging machine that fills a single package with both primary and secondary products in a fast and efficient manner.

SUMMARY OF THE INVENTION

A fill system for use in a packaging machine is disclosed for filling a container with a primary and a secondary product. The fill system includes a primary pump system for pumping a predetermined amount of the primary product received at an inlet thereof to an outlet thereof. A primary fill pipe having an outlet overlying a container processing path along which the containers are filled and sealed by the packaging machine is connected to receive the predetermined amount of primary product from the outlet of the primary pump system. A nozzle is connected at the outlet of the fill pipe.

The fill system further includes a secondary pump system for pumping a predetermined amount of the secondary product received at an inlet thereof to an outlet thereof. A secondary fill pipe is connected to receive the predetermined amount of secondary product from the outlet of the secondary pump system. The secondary fill pipe is concentrically disposed in the primary fill pipe and has an outlet that likewise overlies the container processing path. A valve mechanism is disposed, for example, concentrically within the secondary fill pipe and includes a sealing member positioned at the outlet of the secondary fill pipe. The sealing member is operable to control the flow of the secondary product from the secondary fill pipe.

In accordance with one embodiment of the fill system, the primary product is skim milk and the secondary product is cream. The skim milk and cream are dispensed into the packaging container in the necessary proportions to provide milk having a selected milkfat concentration. In such instance, the valve mechanisms and/or pump mechanisms may, for example, be actuated to begin dispensing cream into the container prior to the time that skim milk is dispensed by the primary pump system through the primary fill pipe and into the container. Alternatively, the dispensing of the predetermined amount of cream into the container may be generally complete prior to the time that the skim milk begins to be dispensed into the container. By dispensing at least a small amount of cream into the container prior to dispensing skim milk, filling speeds may be increased since the cream tends to dampen any foaming of the resulting milk mixture in the container.

The primary fill pipe, in accordance with one embodiment thereof, may be adapted for use in filling a cool product into the container. In accordance with this adaptation, the fill pipe is formed as a generally cylindrical pipe for dispensing the cool product therethrough and has an outlet overlying the container processing path. A nozzle is connected about the exterior perimeter of the outlet of the fill pipe. The fill pipe is concentrically disposed within an insulation pipe and is in close conformity therewith. When so engaged, the portion of the nozzle disposed about the exterior perimeter of the fill pipe forms a seal between the fill pipe and the insulation pipe to inhibit dripping of condensation into the container. Additionally, a thin insulating layer, such as air, is disposed between the fill pipe and the insulation pipe so that the insulation pipe itself is less subject to the forming of condensation about its exterior.

The fill system may include a user interface and control system that facilitates user selection of the milkfat content of the dispensed milk and, further, controls actuation of the various valves and pumps to effect proper dispensing in accordance with the user's selection. The system includes a user interface for allowing the user to specify the milkfat content of the milk. Any number of user interfaces are suitable for such use.

The control system accepts the selections made by the user from the user interface and effects automatic control of the dispensing of the primary and secondary products into the container. In accordance with one embodiment of a controllable fill system, the system employs primary and secondary piston pumps. The length of the stroke of the piston of the primary pump determines the amount of skim milk that is dispensed into the container. Similarly, the length of the stroke of the piston of the secondary pump determines the amount of cream dispensed into the container. The primary fill pipe is connected to receive the skim milk from the outlet of the primary pump, while the secondary fill pipe is connected to receive the cream from the outlet of the secondary pump. As previously described, the secondary fill pipe is concentrically disposed in the primary fill pipe, both fill pipes having outlets overlying the container processing path. The control system controls the length of the stroke of the primary pump to dispense a predetermine amount of skim milk into the container and further controls the length of the stroke of the secondary pump to dispense a predetermined amount of cream into the container. Numerous control system configurations are suitable for use in the fill system.

Other objects, features, and advantages of the fill system will become apparent upon review of the following detailed description and drawings.

BRIEF DESCRIPTION OF THE DRAWINGS

FIG. 2 is a side elevational view of a fill pipe assembly used in the fill system of FIG. 1.

FIGS. 3–13 illustrate the valve rod, sealing ring, and nut of the valve assembly that is concentrically disposed in the secondary fill pipe.

FIGS. 41 and 42 are graphs illustrating how the fill system may begin dispensing cream before it begins dispensing skim milk.

DETAILED DESCRIPTION OF THE DRAWINGS

Figure 1:
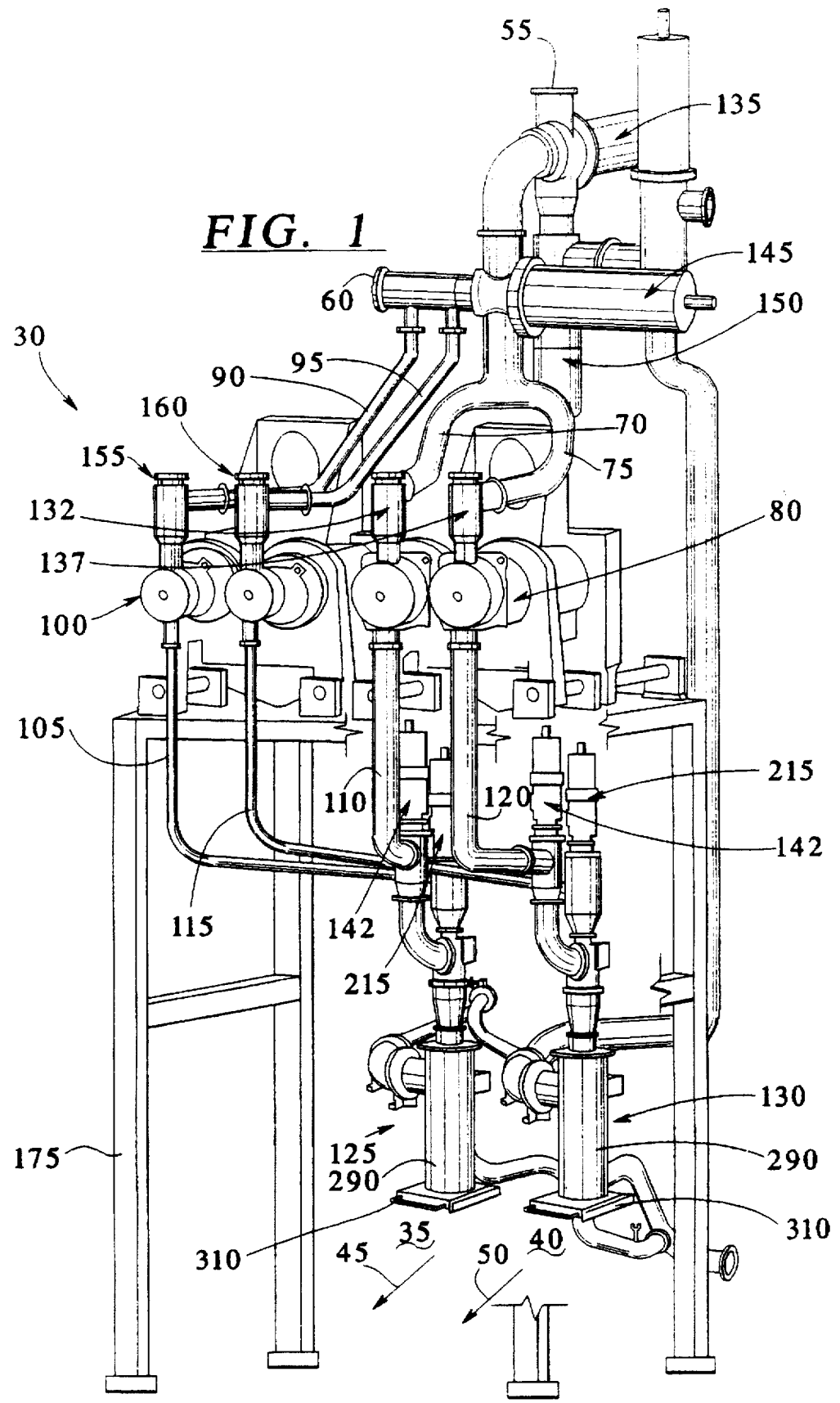
FIG. 1 is a perspective view of the fill system.
Figure 6:
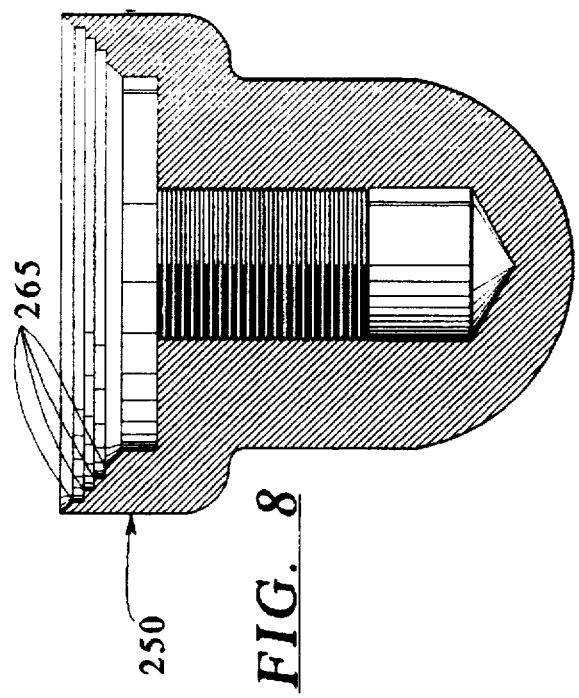

FIG. 1 is a perspective view of the various components of one embodiment of a fill system, shown generally at 30. The illustrated fill system 30 includes two parallel filling stations 35 and 40 that overlie respective parallel container processing paths 45 and 50 along which respective lines of containers are filled and sealed. Each of the filling stations 35 and 40, as will be set forth in detail below, dispense a primary and secondary product into each of the containers as the containers are transported along their respective container processing paths 45 and 50. Although two separate filling stations 35 and 40 are illustrated, a single filling station is also contemplated as being suitable for use in a packaging machine.

The fill system 30 includes a primary product inlet 55 for accepting a primary product, such as skim milk, from a primary product storage tank (not illustrated). A secondary product inlet 60 is connected to accept a secondary product, such as cream, from a secondary product storage tank (not illustrated). Inlet pipes 70 and 75 guide the primary product to a primary pump mechanism 80 that, as will become apparent from the description below, includes a dual piston pump, each piston respectively associated with one of the filling stations 35 and 40. Similarly, inlet pipes 90 and 95 guide the secondary product to a secondary pump mechanism 100 which likewise includes a dual piston pump.

The pump mechanisms 80 and 100 are connected to respective intermediate pipes 105, 110, 115, and 120. Intermediate pipes 105 and 110 proceed from respective piston cylinders of the primary and secondary pump mechanisms 80 and 100 to guide the primary and secondary products to fill tube assembly 125. Intermediate pipes 115 and 120 proceed from respective piston cylinders of the primary and secondary pump mechanisms 80 and 100 to guide the primary and secondary products to fill tube assembly 130. A plurality of valve mechanisms 132, 135, 137, 140, 142, 145, 147, 150, 155, and 160 control the flow of the primary and secondary products along the pipes 70, 75, 90, 95, 105, 110, 115, and 120 in a manner that will be described below that is dependent on whether the fill system is to be cleaned, initially filled, drained, or is engaged in production filling. The valves may be constructed in accordance with one or more of the teachings of U.S. Pat. Nos. 3,643,679; 4,913,185; and European Patent 191 192B1. To ensure hygenic operation of the system, each of the valves may be connected to a vacuum generator which vacuum isolates several of the valves moving components from the valve chamber.

All of the various illustrated product conducting pipes that are utilized in the fill system 30 may be inclined. As such, the tasks of draining the system and, further, eliminating air bubbles in the system as it is fried, become easier to implement.

The fill system 30 may be used to replace a single product fill system used in an existing packaging machine. In such instance, it is desirable to provide a support frame 175 as a component of the overall fill system 30. For example, the illustrated fill system may be mounted for use in a packaging machine such as a Model TR/7 currently available from Tetra Rex Packaging Systems, Inc., of Buffalo Grove, Ill.

Each fill tube assembly 125 and 130 at each filling station 35 and 40 is supplied with both the primary and secondary products. One embodiment of a fill tube assembly 125 suitable for use in the present filling system is illustrated in FIG. 2.

The fill tube assembly includes a primary fill pipe 180 and a secondary fill pipe 185 that is concentrically disposed in the primary fill pipe 180. The primary fill pipe 180 accepts primary product from intermediate pipe 110 at inlet 190 while the secondary fill pipe 185 accepts secondary product from intermediate pipe 105 at inlet 195. A nozzle 200 that may be formed from a flexible material, is disposed at the outlet 205 about the exterior perimeter of the primary fill pipe 180.

The secondary fill pipe 185 proceeds concentrically into the primary fill pipe 180 and has an outlet 210 disposed a distance above outlet 205 of the primary fill pipe 180. As such, the primary and secondary products may, if desired, be mixed in the primary fill pipe 180 prior to being dispensed into a container through nozzle 200.

A valve mechanism, shown generally at 215, controls the flow of the secondary product from the outlet 210 of the secondary fill pipe 185. The valve mechanism 215 includes an actuator 220 disposed at the upper portion of the secondary fill tube 185. The actuator 220 includes a pneumatically operated cylinder 225 that houses a piston that, in turn, is connected to actuate a valve rod 230 that is disposed concentrically within the secondary fill pipe 185. The valve rod 230 includes flattened guide members 235 that may be arranged orthogonally. A sealing member 237 is disposed on the valve rod 230 proximate the outlet 210 of the secondary fill tube 185. The sealing member 235 engages the outlet 210 to seal off the flow of secondary product from the secondary fill tube 185 when the actuator 225 moves the valve rod 230 and sealing member 237 to the illustrated position. The actuator 225 may be pneumatically operated to move the valve rod 230 and sealing member 237 to a second position in which the sealing member 237 is disengaged from the outlet 210 thereby allowing the secondary product to flow from the secondary fill pipe 185.

FIGS. 3–13 illustrate the components constituting the valve rod 230 and the sealing member 237. As shown, the sealing member 237 engages the flared end 240 of the valve rod 230. A fastening stem 245 extends from the flared end 240. The sealing member 237 may be formed as two separate components: a nut 250 that, for example, is constructed of stainless steel, and a sealing ring 255 that, for example, is constructed from hardened teflon. When assembled, the nut 245 engages the fastening stem 245 with the sealing ring 255 disposed therebetween.

Figure 8:
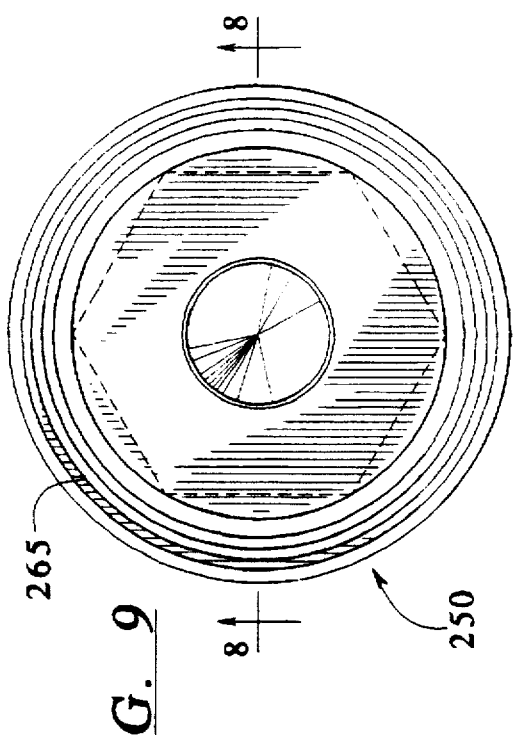
Figure 7:
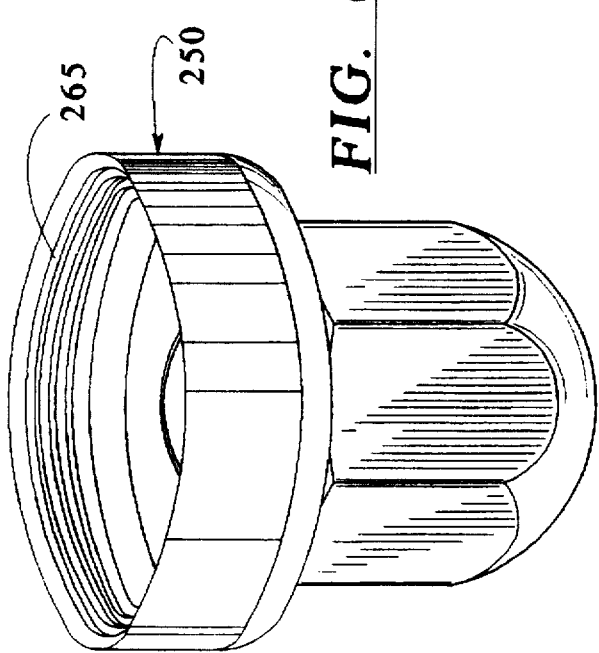
Figure 9:
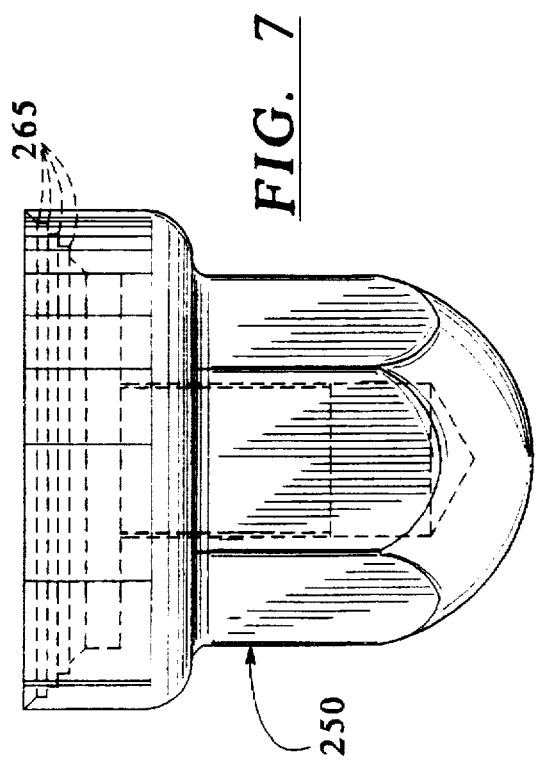
Figure 10:
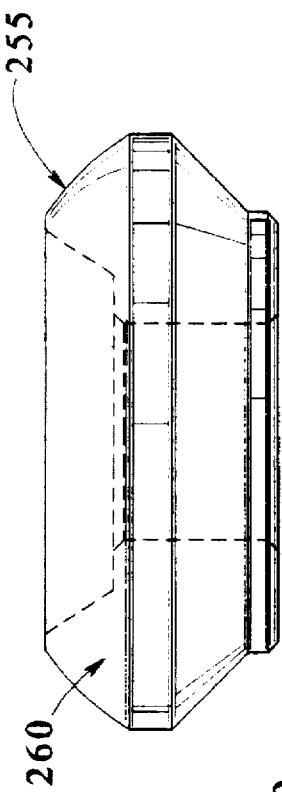
Figure 12:
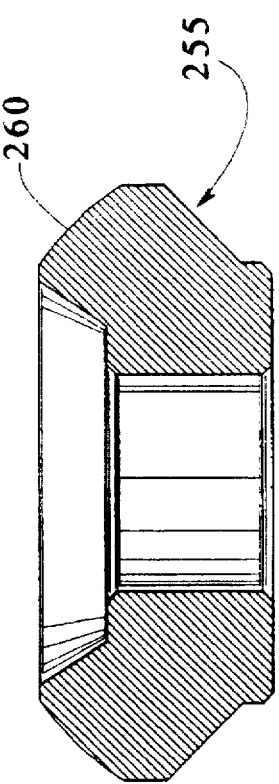
Figure 11:
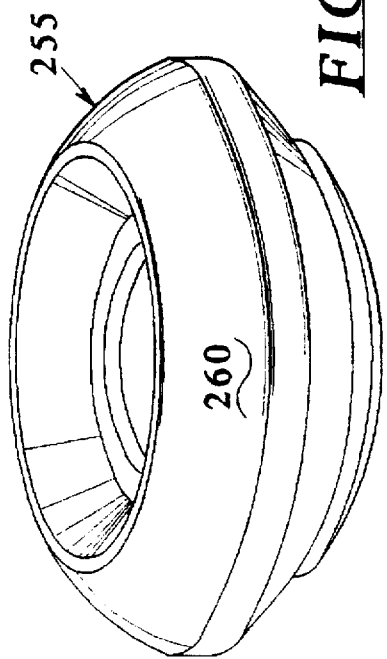
Figure 13:
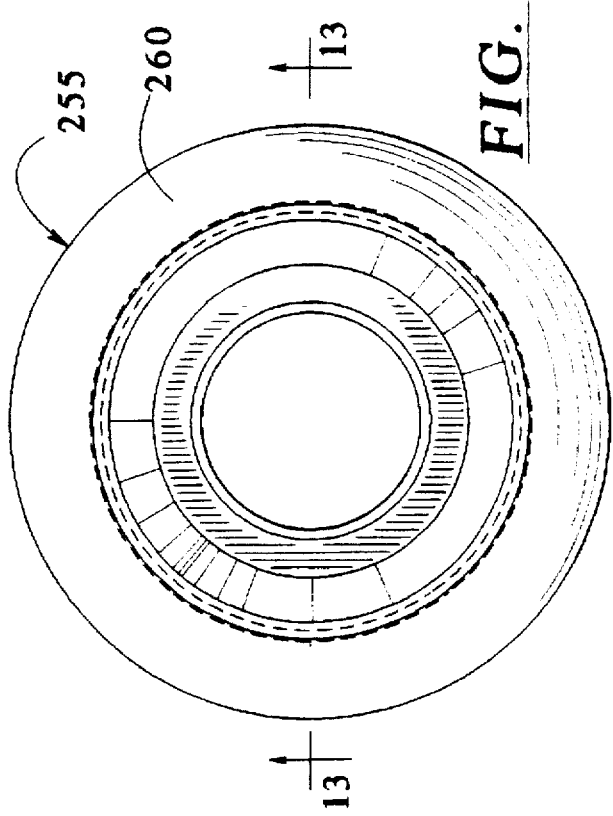

FIGS. 8 and 13 are cross-sectional views of the sealing ring 255 and nut 250 illustrating the various aspects of their respective constructions that enhance sealing and stability of construction. For example, sealing ring 255 includes bevelled surfaces 260 that conform to the outlet 210 of the secondary fill pipe 185 to enhance the integrity of the seal therebetween when the rod 230 and sealing member 237 are in the aforementioned first position. Further, the nut 250 includes cutting edges 265 that engage the sealing ring 255 when the valve rod 230 and sealing member 255 are assembled thereby providing secure engagement therebetween.

Condensation at the exterior of a fill pipe often results when the fill pipe is used to dispense a cool product, such as refrigerated milk. This condensation can drip into the container as it is being filled thereby compromising the hygiene of the contents. Accordingly, the primary fill pipe 180, as illustrated in FIG. 2, is concentrically disposed in an insulation pipe 275 and is in close conformity therewith. A thin insulating layer 280 may be disposed between the exterior of the primary fill pipe 180 and the interior of the insulation pipe 275. The portion of the nozzle 200 proceeding about the exterior of the primary fill pipe 180 forms a seal with the primary fill pipe 180 and the insulation pipe 275. Any condensation forming on the primary fill pipe 180 is thus prevented from dripping into the carton. Further, condensation on the exterior of the insulation pipe 275 is reduced, if not eliminated, since the insulation pipe 275 is insulated from the primary fill pipe 180 by the insulating layer 280. Alternatively, or in addition to the foregoing, the insulation pipe 275 may be formed from an insulating material.

A cleaning sleeve 290 is disposed about the exterior of the insulation pipe 275 and includes fillid apertures 295 and 300. A cleaning cover 310 is placed at the mouth 315 of the cleaning sleeve 290 to seal off the flow of fillid from the mouth 310 during cleaning. The cleaning cover 310 comprises a plurality of arcuate reservoirs 320 joined together at a portion of the cleaning cover 310 that is disposed below a central portion of the nozzle 200. The reservoirs 320 divert the flow of cleaning fillid that flows from the primary and secondary fill pipes 180 and 185 so as not to cause nozzle 200, such as one formed from a flexible material, to deform from the backslash that may occur with a cover plate that does not have such reservoirs. An inflatable bladder (not illustrated) may be used to assist sealing between the mouth 315 and the cover 310.

Figure 14:
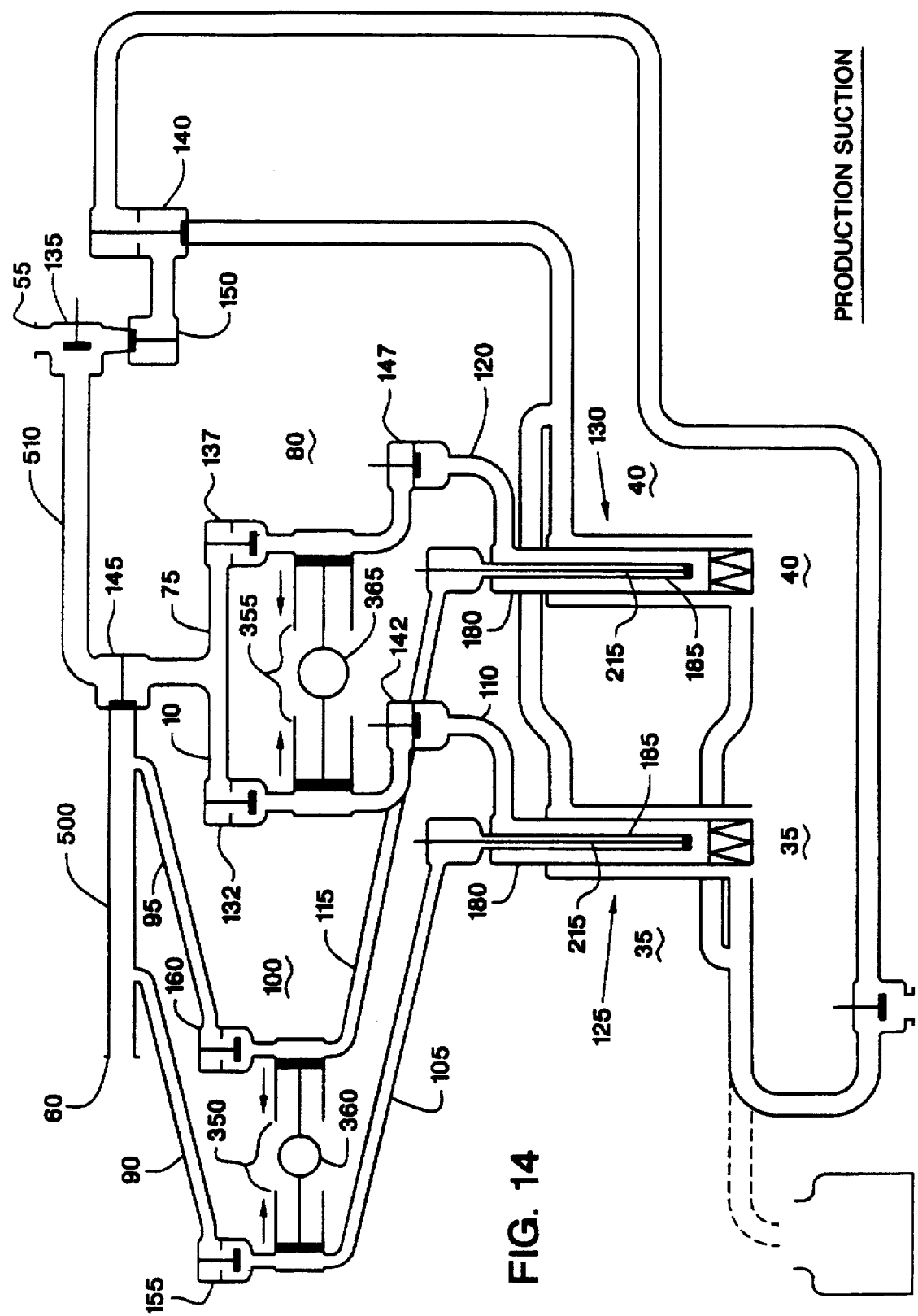
FIGS. 14 and 15 are schematic diagrams showing operation of the fill system during production suction and dispensing.
Figure 15:
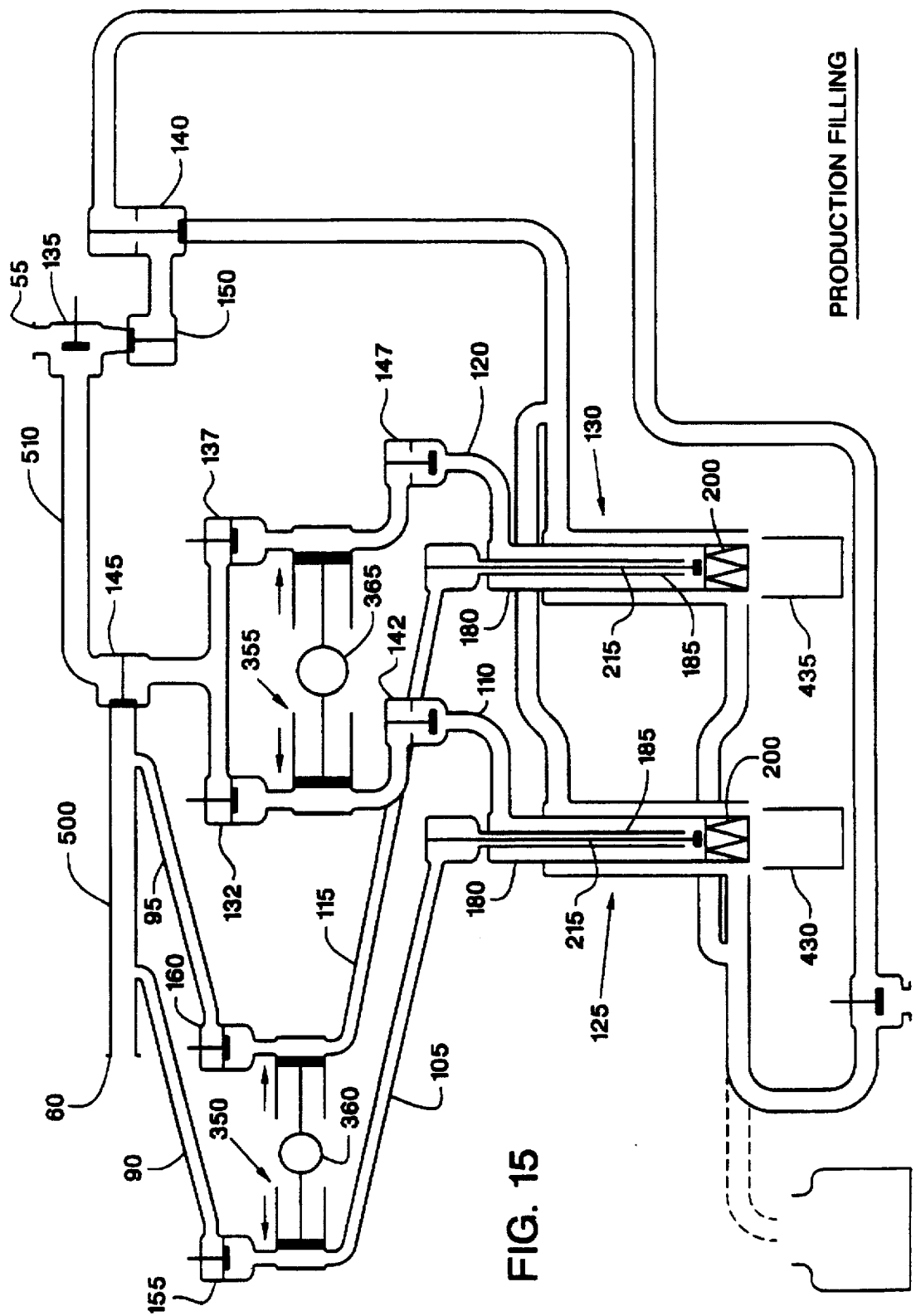

FIGS. 14 and 15 are schematic block diagrams of the fill system 30 illustrating the operation of the pump mechanisms 80 and 100, the valve mechanisms 135–160, and valve mechanism 215 of the secondary fill pipes 185 during production suction and filling. As illustrated, pump mechanisms 80 and 100 each include dual piston pumps 350 and 355 that are driven by a respective motor 360 and 365, such as a servomotor. The dual piston pumps 350 may be pumps such as the type shown in FIG. 25 that is designed to simultaneously drive two pistons.

In production filling, the fill system 30 first executes a production suction operation. This operation, illustrated in FIG. 14, involves dosing or maintaining closure of valve mechanisms 140, 145, 147, 150, and 215 while opening valve mechanisms 132, 135, 137, 155 and 160. Servomotors 350 and 355 operate the pistons of their respective dual pumps 350 and 355 to draw in a predetermined amount of the primary and secondary products from the inlet pipes 70, 75, 90, and 95. The servomotor operation is illustrated by the arrows adjacent the pistons of the pumps.

After a predetermined amount of each of the primary and secondary products has been suctioned through inlet pipes 70, 75, 90, and 95 from the primary and secondary storage tanks, the fill system 30 begins the dispensing operation illustrated in FIG. 15. During this operation, valve mechanisms 132, 137, 140, 155, and 160 are closed or remain closed and valve mechanisms 135, 142, 147, and 215 are opened or remain open. Servomotors 360 and 365 operate their respective dual piston pumps 350 and 355 in the manner illustrated by the adjacent arrows to dispense the predetermined amounts of the primary and secondary products through the primary and secondary fill pipes 180 and 185 and nozzle 200 and into containers 200 disposed beneath the pipes on the respective container processing paths 45 and 50.

Figure 16:
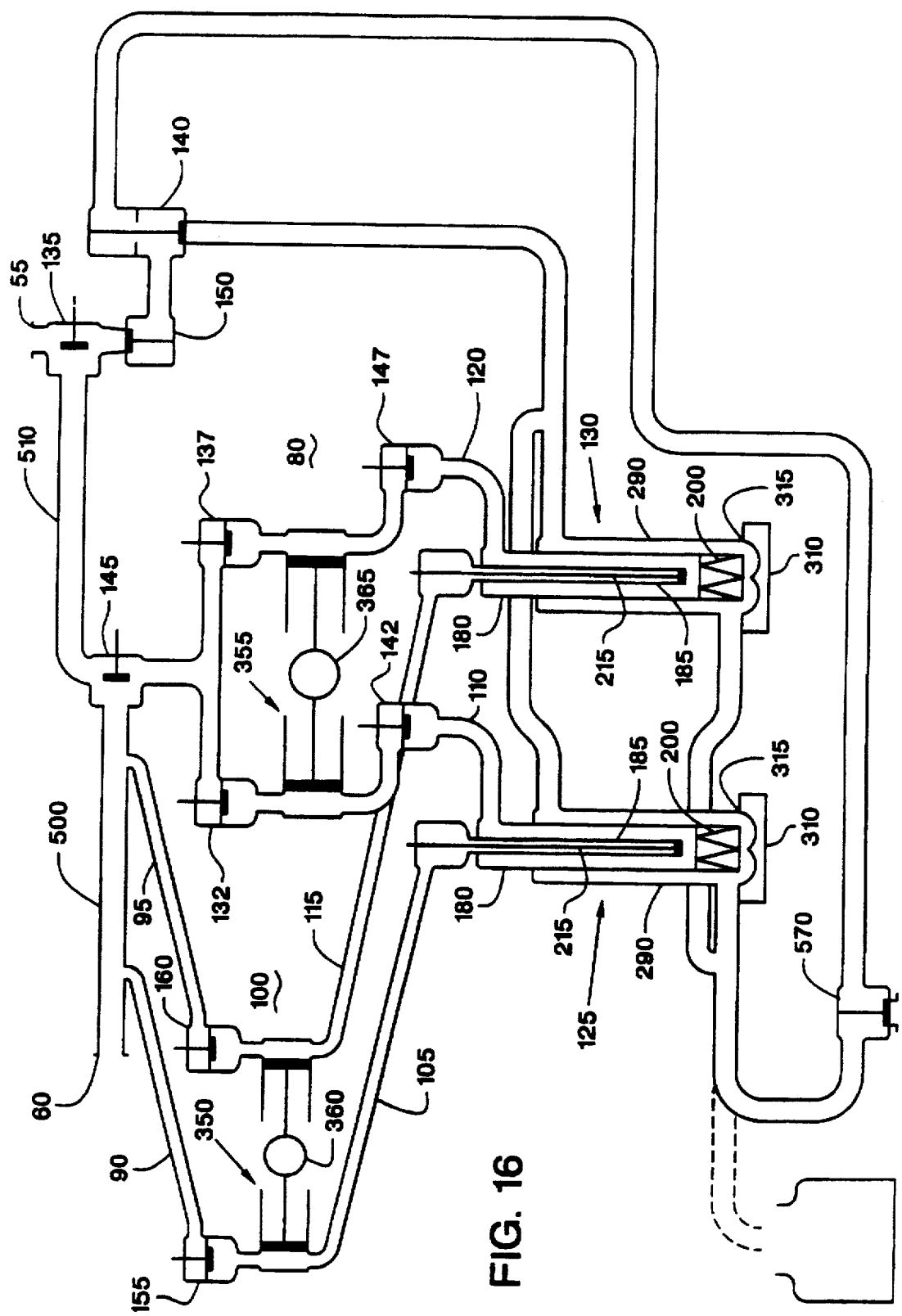
FIGS. 16–18 are schematic diagrams showing operation of the fill system during rinsing.
Figure 17:
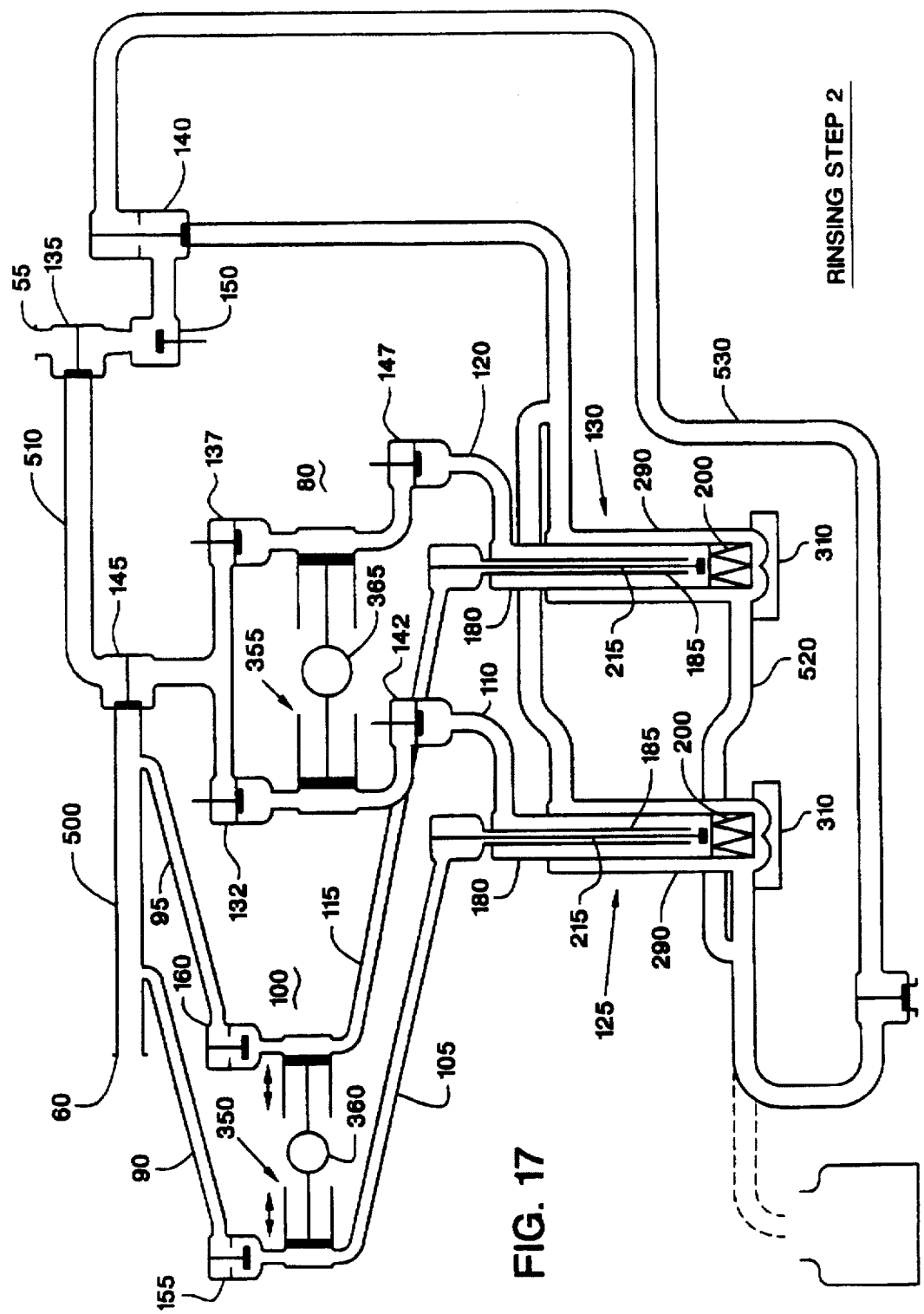
Figure 18:
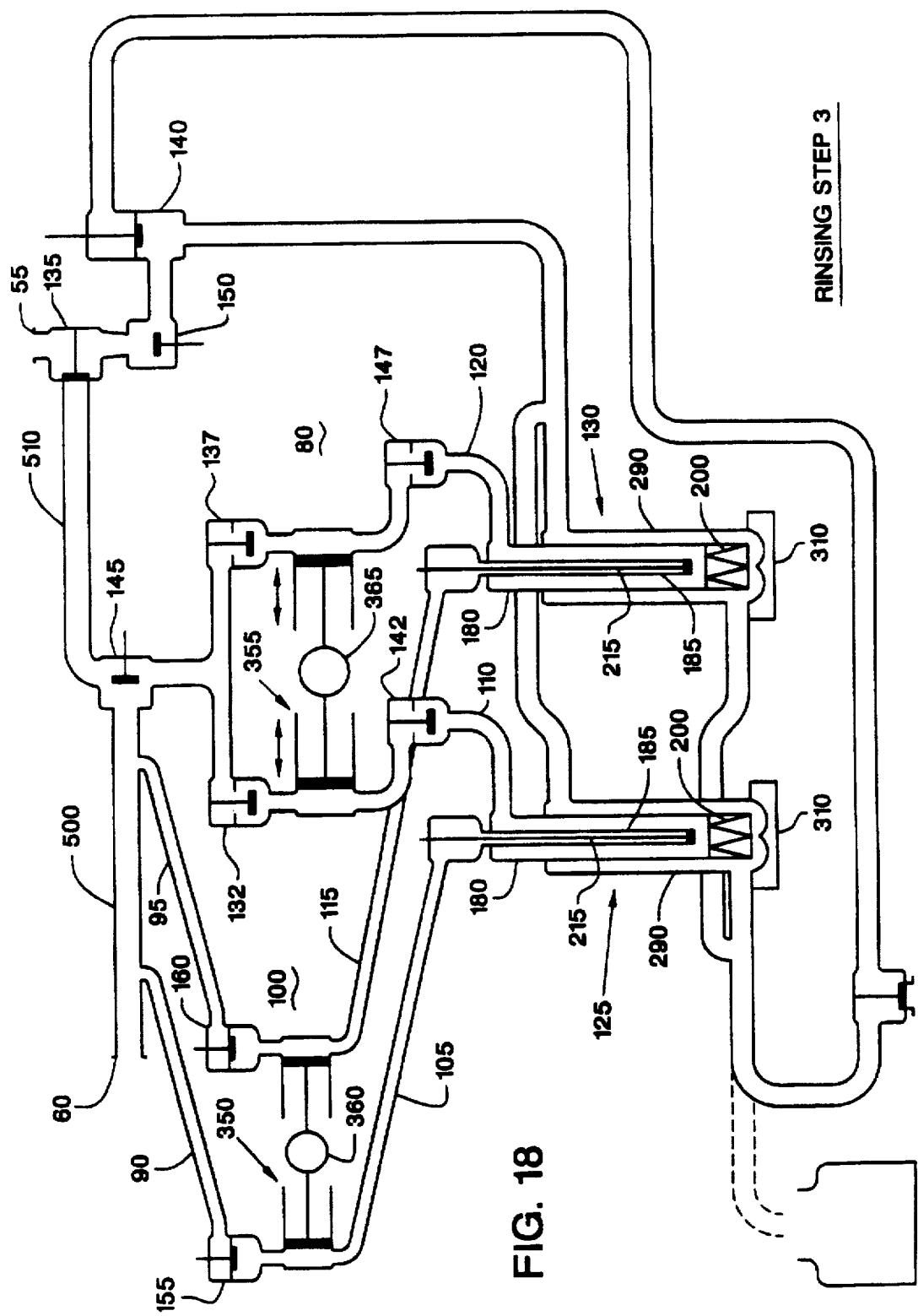

FIGS. 16–18 schematically illustrate rinsing of the fill system 30. Before rinsing, the cleaning covers 310 are placed over the mouths 315 of the cleaning sleeves 290. During the initial step illustrated in FIG. 16, the cross-over pipes 500 and 510 are rinsed by opening valve mechanism 135 and 145 while closing valve mechanisms 132, 137, 150, and 160.

In a secondary product rinsing step, illustrated in FIG. 17, the secondary product system is rinsed by opening valves 155, 160, and 215 and providing rinsing fillid at inlet 60. The servomotor 360 is activated to operate the secondary pump mechanism 350. The rinsing fillid flows through the secondary product system and into pipes 520 and 530, the fillid ultimately exiting the primary product inlet 55 through valves 140 and 150.

In a primary product rinsing step, illustrated in FIG. 18, the valves associated with the secondary product system are closed while the valve mechanisms associated with the primary system are opened. Rinsing fillid is supplied at inlet 60 and enters the primary system through valve 145. The servomotor 365 is activated to operate the primary pump mechanism 355. The rinsing fillid flows through the primary product system and ultimately exits the primary product inlet 55. When the system is drained after rinsing, the resulting fillid is diverted out drain valve 570.

Figure 19:
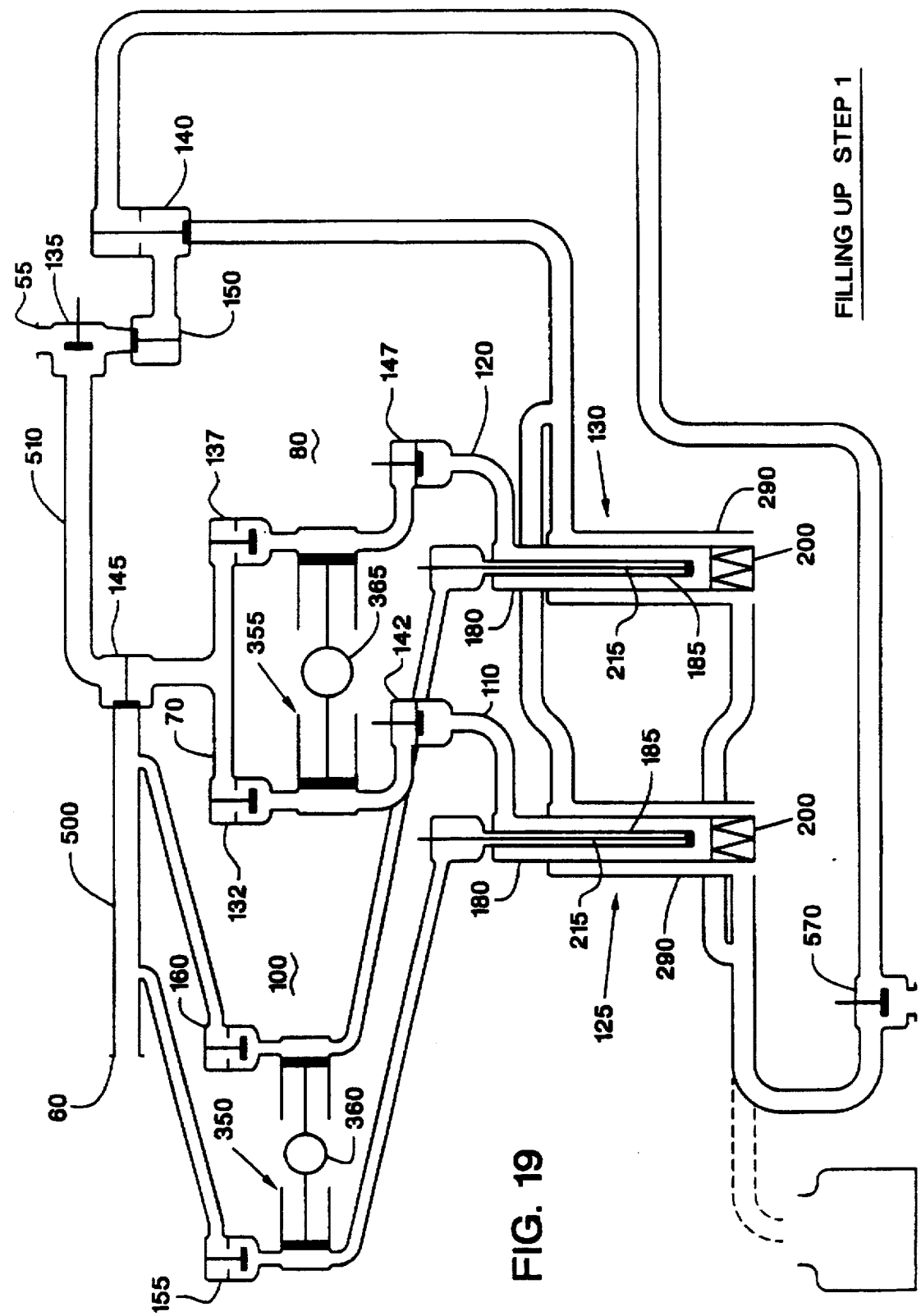
FIGS. 19–21 are schematic diagrams showing operation of the fill systems during initial filling of the primary and secondary products.
Figure 20:
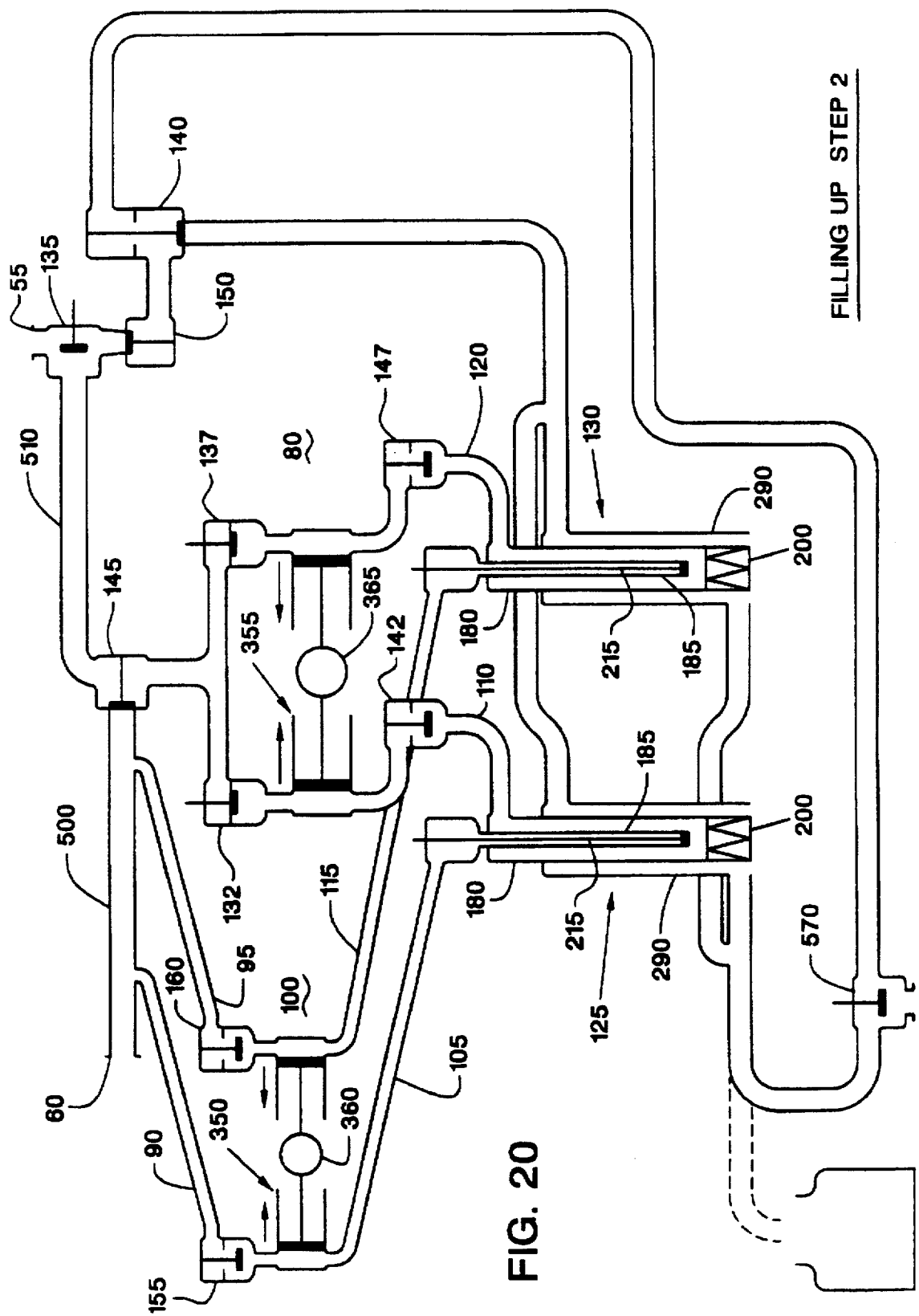
Figure 21:
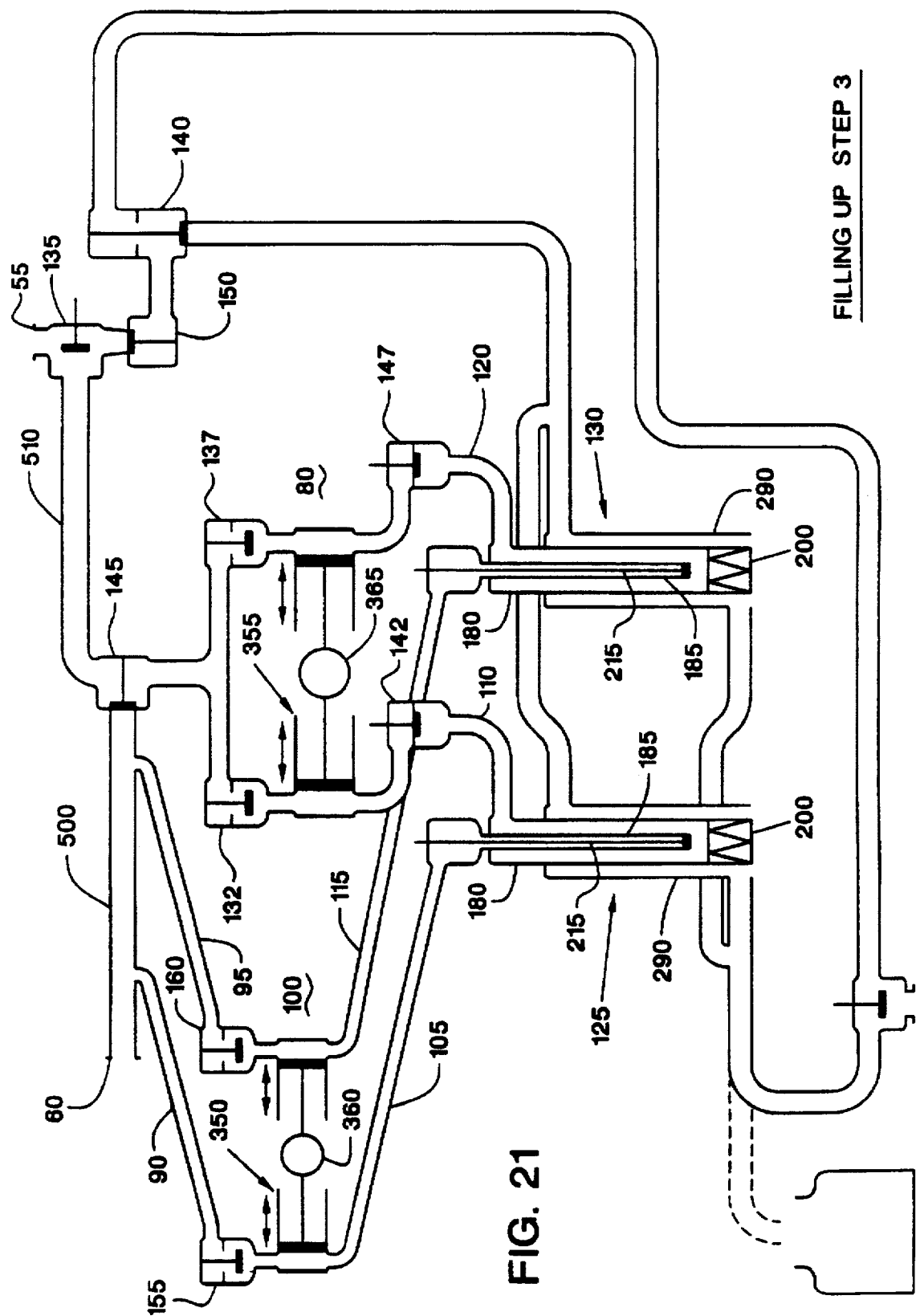

FIGS. 19–21 illustrate one manner in which the fill system 30 is initially filled with the primary and secondary product prior to the production filling process. In the filling up process, the valves 132, 137, 155, and 160 are first opened while the valves 142, 147, and 215 are closed. This allows the upper portion of the primary and secondary systems to fill with the respective product. As shown in FIG. 20, the pump mechanisms 350 and 355 are then actuated by the servomotors 360 and 365 while valve mechanisms 132 and 137 are closed and valve mechanisms 142 and 147 are opened. This facilitates removal of air from the primary and secondary systems and, further, facilitates filling of the lower portion of the primary product system. Finally, as illustrated in FIG. 21, valve mechanisms 142 and 147 are again closed while the servomotors 360 and 365 actuate the pump mechanisms 350 and 355.

Figure 22:
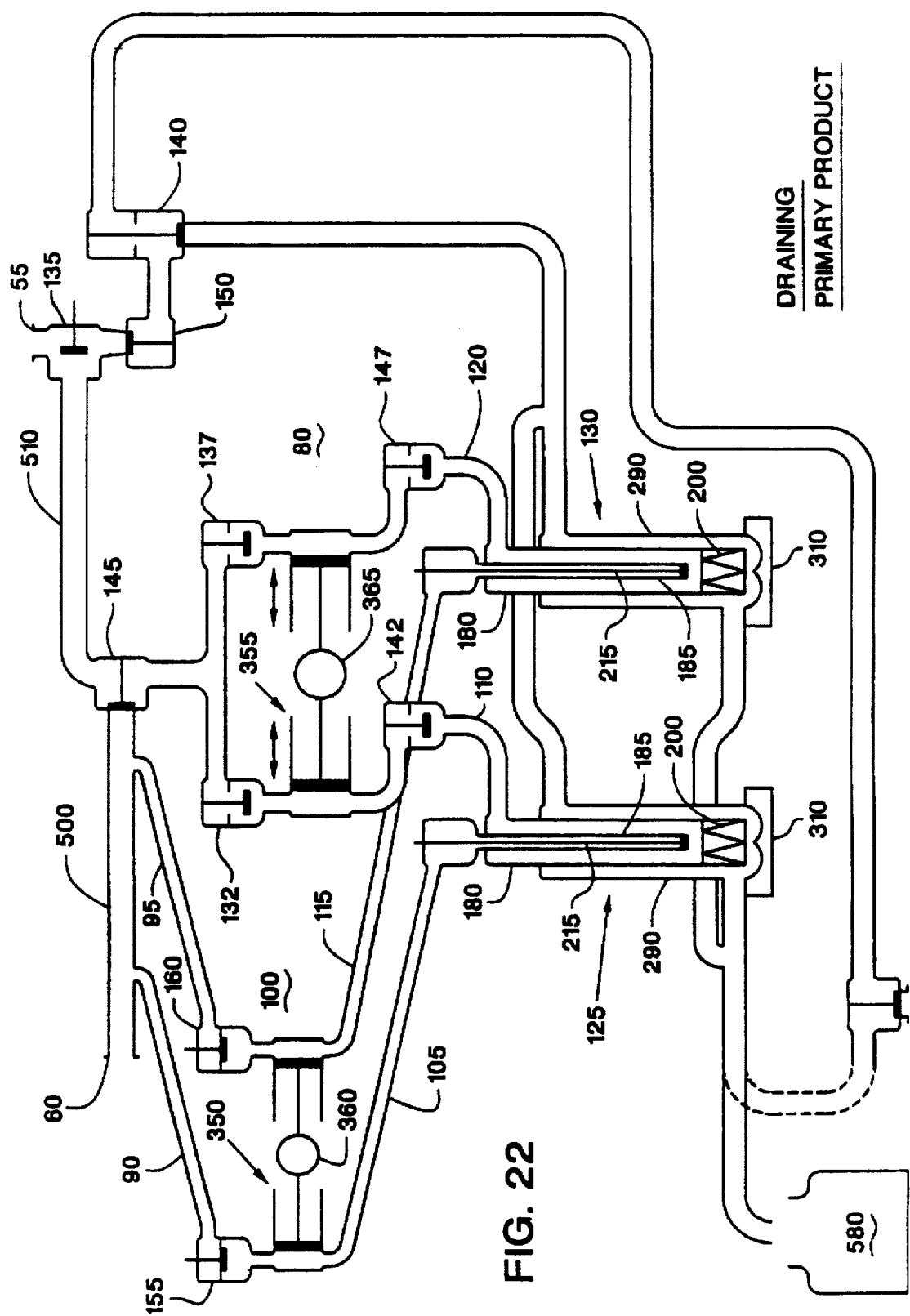
FIGS. 22 and 23 are schematic diagrams showing operation of the fill system during draining of the primary and secondary products from the system.
Figure 23:
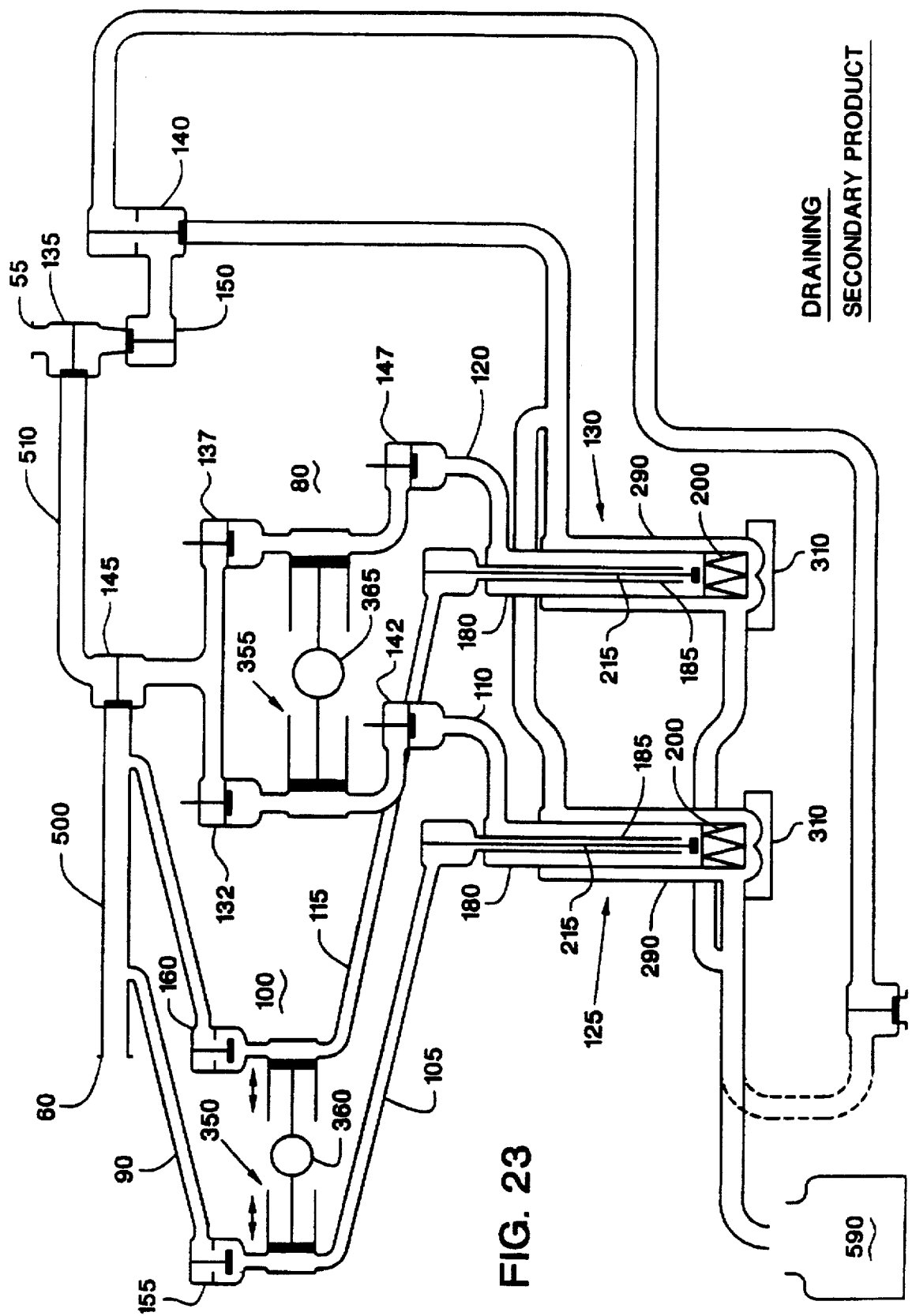

FIGS. 22 and 23 illustrate the draining of the primary and secondary products from the system. In FIG. 22, the primary product is drained by opening valve mechanisms 132, 137, and 142 while operating the primary pump mechanism 355. The cleaning cover 310 is disposed over the cleaning sleeve 290. The primary product is diverted from the apertures 295 and 300 of the cleaning sleeve 290 to a primary product holding tank 580. The secondary product is similarly drained, as illustrated in FIG. 23, into a further secondary product holding tank 590.

Figure 24:
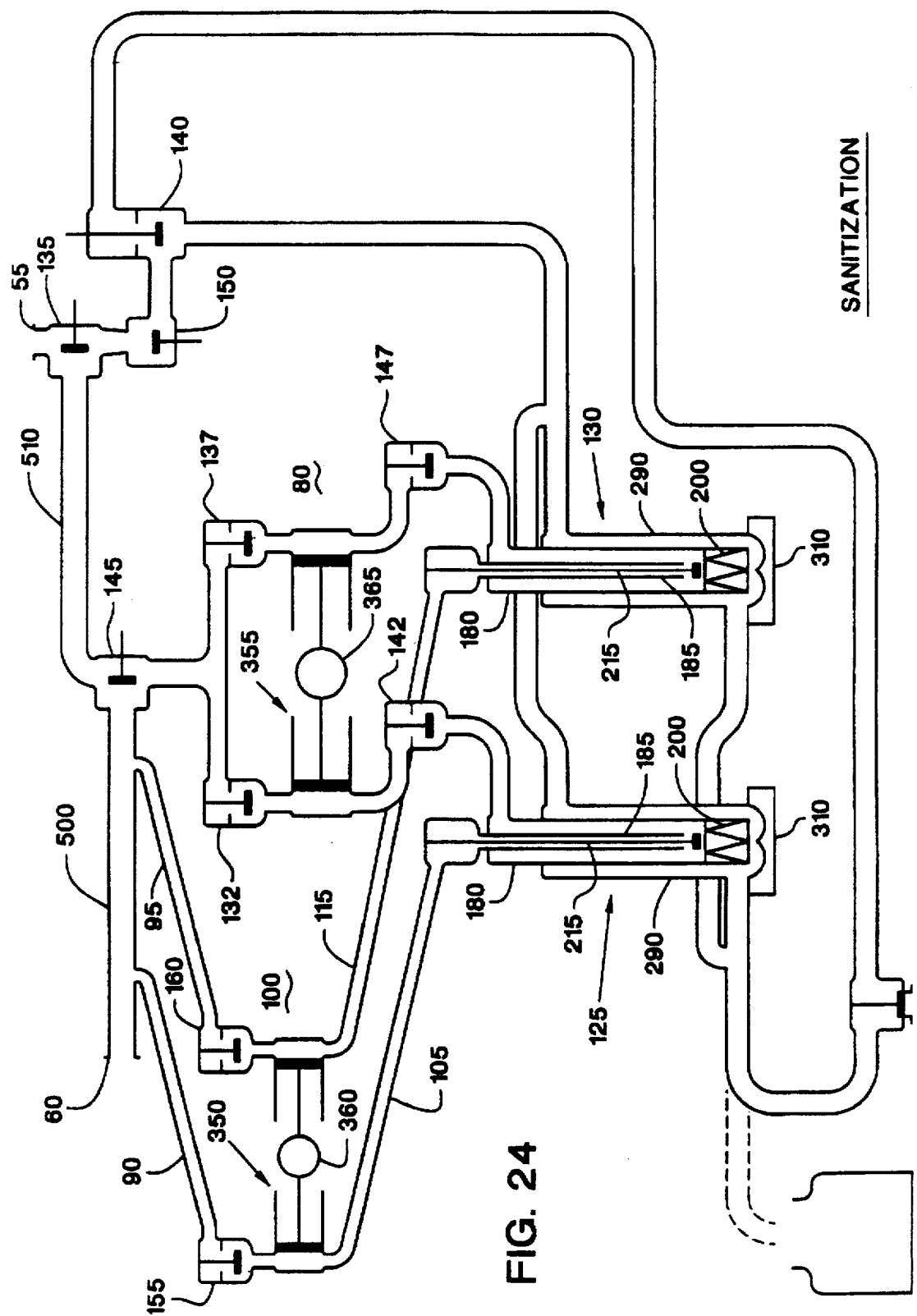
FIG. 24 is a schematic diagram of showing operation of the fill system during sanitization.

FIG. 24 illustrates system sanitization. During sanitization, all valve mechanisms are opened. The cleaning covers 310 are also in place.

Figure 25:
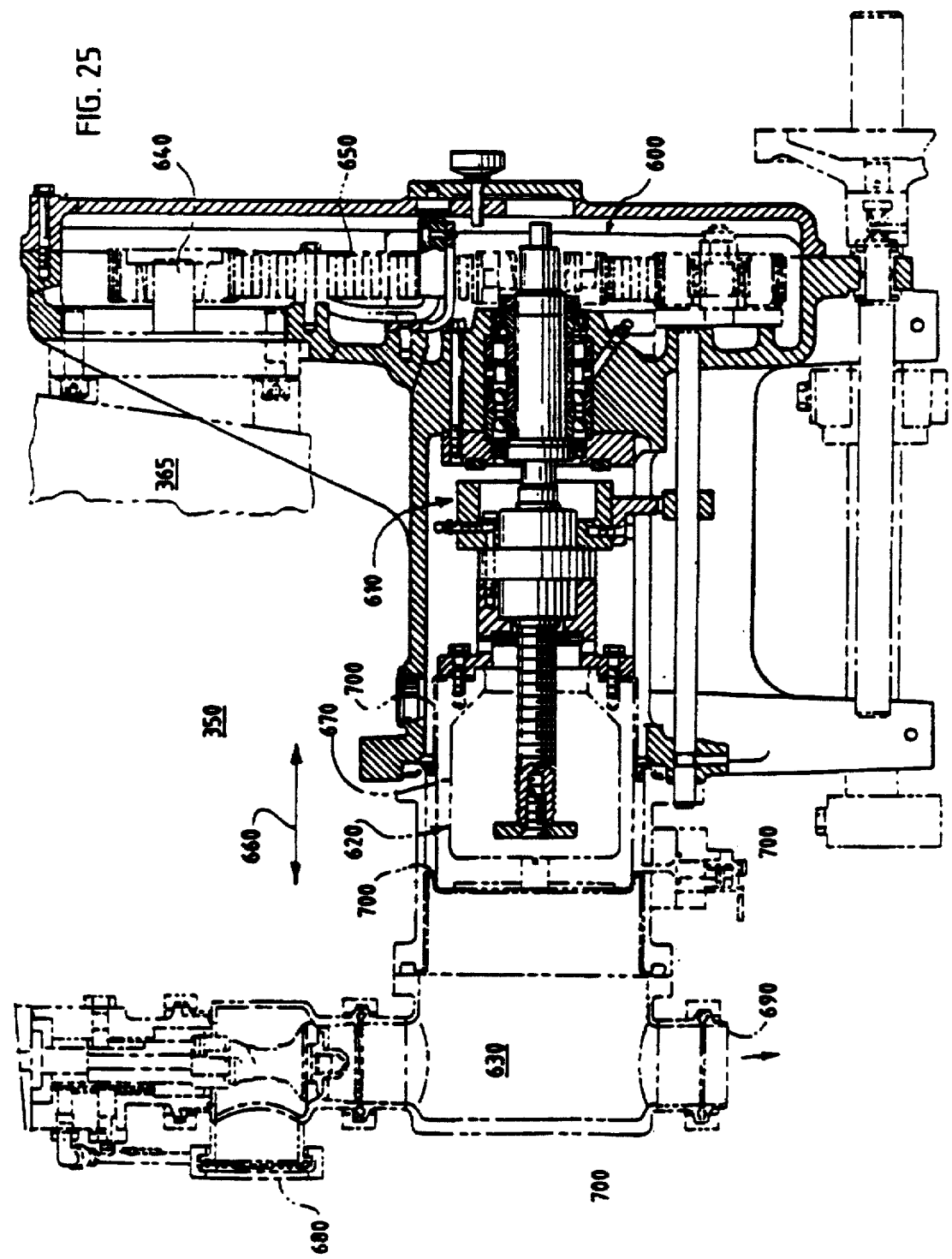
FIG. 25 is a cross-sectional view illustrating one embodiment of a pump mechanism suitable for use in the present fill system.

FIG. 25 illustrate one embodiment of a pump mechanism 350 suitable for use in the present fill system 30. The pump mechanism 350 includes a belt drive portion 600, a screw drive portion 610, a piston portion 620, and a cylinder 630. The belt drive portion 600 is connected for actuation to the shaft 640 of the servomotor 365. The shaft 640 drives a drive belt 650 which, in turn, actuates the screw drive portion 610. The screw drive portion 610 is connected to drive the piston portion 620 in a back and forth direction, illustrated here at arrow 660, based on the direction of rotation of the shaft 640 of the servomotor 365. Movement of the piston 670 in the piston portion 620 causes the cylinder 630 to alternately fill the cylinder 690 through inlet 680 with the product and empty the product from the cylinder 630 through outlet 690.

A membrane 700 is disposed about the piston 670 to hygienically isolate the piston 670 from the cylinder 630. Such a construction is shown in U.S. Pat. No. 5,090,299 which is hereby incorporated by reference. In the presently disclosed embodiment, the belt 650 drives two such screw drive and piston assemblies to effect the dual pump mechanism. The screw drives and piston assemblies may be disposed in a side-by-side relationship. The belt may be disposed about a tensioning gear to maintain the proper tension for effective driving of the dual pump mechanism.

FIGS. 26-33 illustrate several hardware embodiments of a user interface and control system suitable for use in the present fill system 30. FIG. 25 illustrates an embodiment of the system that may be used in an existing machine, such as a Tetra Pak TR/7 packaging machine, that has been converted to employ the presently disclosed fill system. As illustrated in FIG. 25, the user interface and control system, designated generally at 800 may include a VME bus rack 810 that includes a programmable logic controller ("PLC") 820, an I/O interface device 830, a communication device ("CMM") 840, and a programmable axis controller ("PAM") 850. The PLC 820, I/O 820, CMM 840, and PAM 850 may all communicate with one another along a VME bus. The system 800 also includes a control panel 860 and a machine controller 870 that already exists in the machine to control the movement and sealing of the containers as they proceed through the machine.

The PLC 820 controls the interface between the existing machine controller 870 and the added user interface and control system 800. Such control may, for example, occur via the I/O interface device 830 along a serial communications line 880 or the like. Data may be exchanged to ensure coordination between the container filling by the fill system and the movement of the containers along the container processing path within the existing machine.

The CMM 840 acts as an interface with the control panel 870 which facilitates user entry of the relative proportions of the primary and secondary products as well as the container volume. Key presses may be communicated to the CMM 840 which, in turn, may communicate the key presses to the PLC 820 and/or PAM 850 for further processing. Similarly, the PAM 850 and/or PLC 820 may communicate information to the control panel 860 via the CMM 840 for displaying information to the user.

The PAM 850, which may be a PAM such as one available from Socapel, communicates along lines 890 and 900 with servo amplifiers 910 and 920, which may be servo amplifiers such as the Model ST-1 also available from Socapel. Servo amplifier 910 controls the motion of the piston of the primary pump 355 along one or more lines 930 while servo amplifier 920 controls the motion of the piston of the secondary pump 350 along one or more lines 940. The servo amplifiers 910 and 920 may also include input and output lines, shown here as lines 950 and 960, that interface with the inlet and outlet valves of the respective primary and secondary fill systems. The opening, closing, and status of the inlet and outlet valves may thus be controlled and detected.

Figure 28:
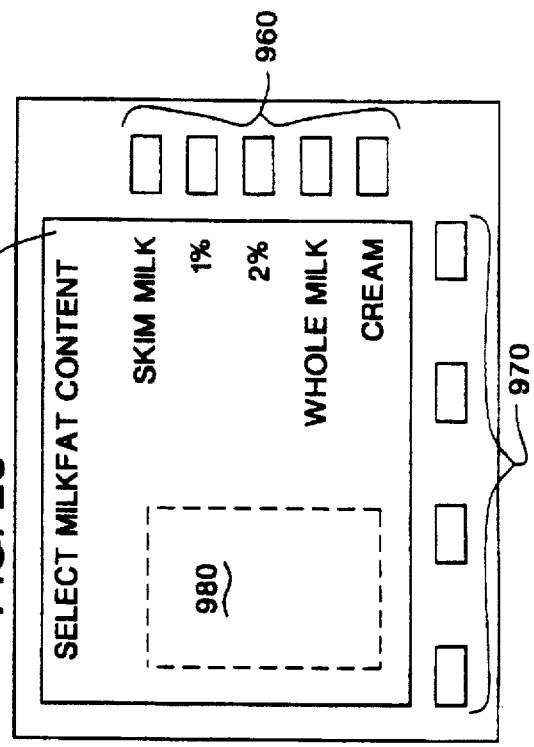
Figure 27:
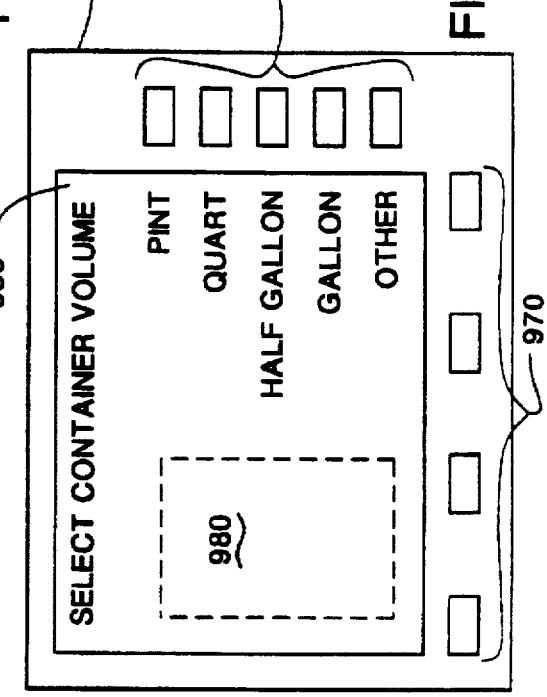

A variety of control panels 860 suitable for use in the present fill system 30 are disclosed in FIGS. 27-30. As illustrated in FIG. 27, the control panel 860 may include a display screen 950, a plurality of vertically oriented selection keys 960 along a side thereof and a further plurality of horizontally disposed keys 970 along, for example, the bottom thereof. The screen 950, such as an LCD screen or CRT, may be used to display user prompt information. In the example of the display panel shown in FIG. 27, the user is prompted, for example, to first select the volume of the container that is to be filled. Five potential selections are shown, each having a keyswitch 960 located adjacent the screen label corresponding to the particular container volume selection. The user may then, for example, be prompted to enter the desired milkfat content of the milk that is to fill each of the containers as illustrated in FIG. 28. Again, five potential selections are shown, each having a keyswitch 960 located adjacent the screen label corresponding to the particular milkfat content. A screen area 980 may be used, for example, to indicate total volume of product in each of the storage tanks, to display the status of the machine, etc. The horizontal keys 970, for example, may be used to initiate the filling cycle, toggle between menus, etc.

Figure 29:
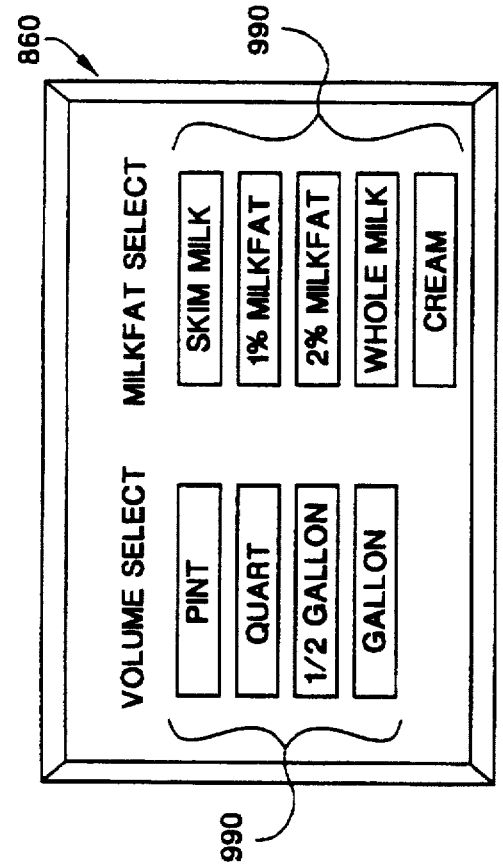

FIG. 29 illustrates a further control panel 860 that may be used in the present system. In this example, the panel 860 is a touch screen monitor. Virtual keys 900 are displayed to prompt the user to select, for example, the desired container volume and milkfat content.

Figure 30:
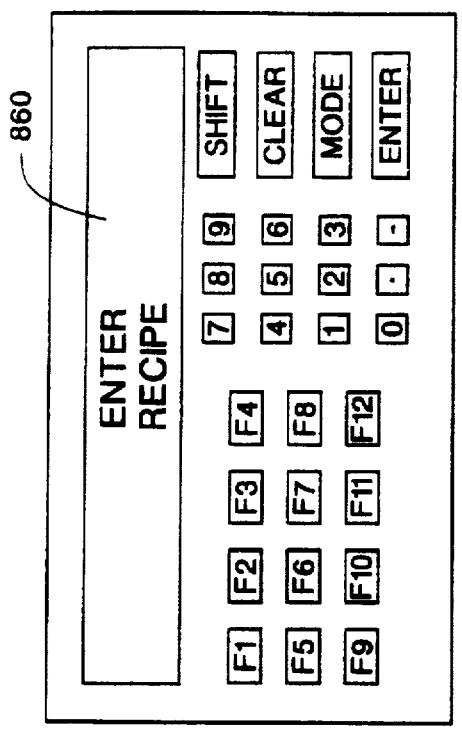

FIG. 30 illustrates a still further control panel 860 which may, for example, be a smart panel such as a Model HE693OIU367 panel manufactured by and available from Horner electronics. Here, for example, the display 1000 may be a 2-line vacuum fillorescent display. Function keys F1-F12 may be pre-programmed to execute, for example, stored recipes. Numerous other display panel configurations are possible, the illustrated configurations being exemplary in all respects.

Figure 31:
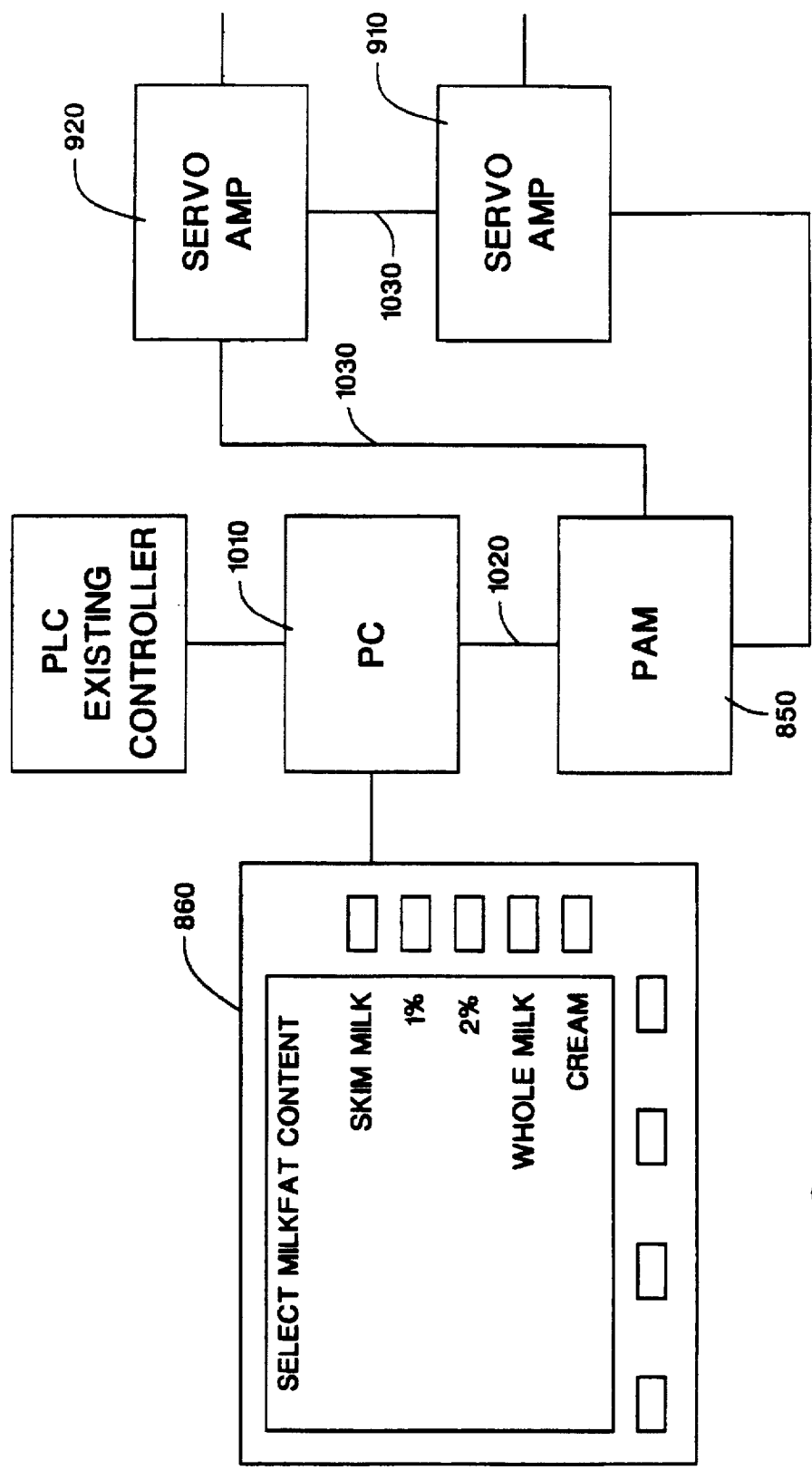

In another embodiment of the user interface and control system 860 shown in FIG. 31, the control panel 860 may be connected for control by, for example, an industrial personal computer 1010 ("PC"). The PC 1010, in turn, may be connected for communication along bus 1020 with the PAM 850. Bus 1020 may be, for example, a VME bus, or any other bus suitable for use with the particular PAM type. The PAM 850 communicates motion information to servo amplifiers 910 and 920 along, for example, a fiber optic link 1030. Each of the servo amplifiers 910 and 920 is respectively associated with the servo motors 360 and 365 controlling the movement of the pistons in the primary and secondary pumps 350 and 355. The servo amplifiers communicate error information to the PAM 850 which, in turn, may execute a system shutdown upon the occurrence of an error. The error information may further be communicated from the PAM 850 to the PC 1010 for display on the control panel 860.

Figure 32:
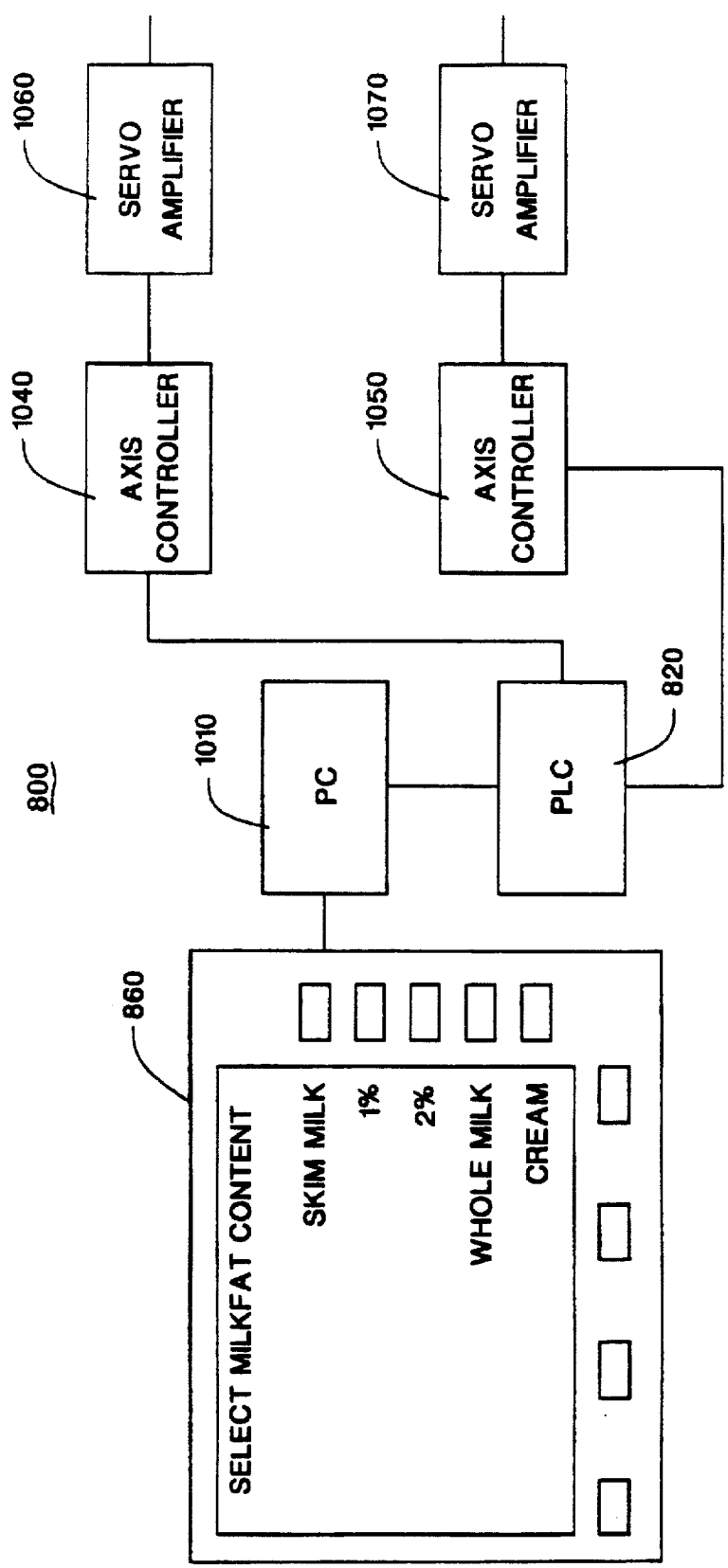

FIG. 32 illustrates another configuration for the user interface and control system 800. In this configuration, a programmable logic controller 820 ("PLC") is connected for communication with the PC 1010. The PLC 820 may be a Series 90 Controller available from GET Fanuc Automation. The PLC 820 communicates with individual axis controllers 1040 and 1050 that control the motion of the servomotors 360 and 365 via respective servo amplifiers 1060 and 1070.

Figure 33:
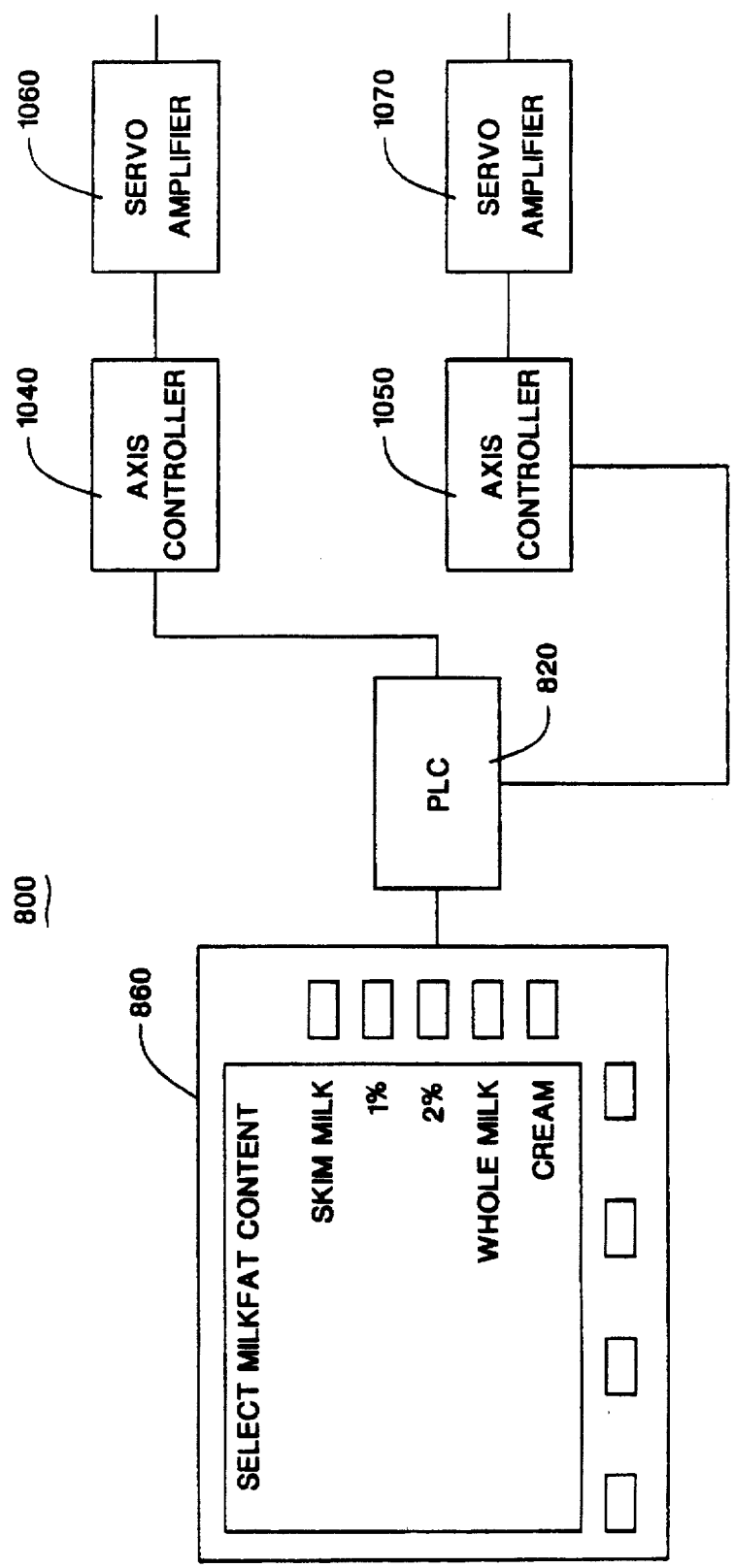

A similar system is illustrated in FIG. 33. Here, however, the PLC 820 does not directly communicate with the control panel 860. Rather, such communications are managed through the PC 1010.

Any number of user interface and control systems are suitable for use in the present fill system. The foregoing illustrated embodiments are but several such systems and are intended to be exemplary of such systems.

FIGS. 34-40 are flow diagrams that describe some of the many ways that are contemplated for operation of the user interface and control system. The illustrated flow diagrams can be implemented with hardware and/or software.

Figure 34:
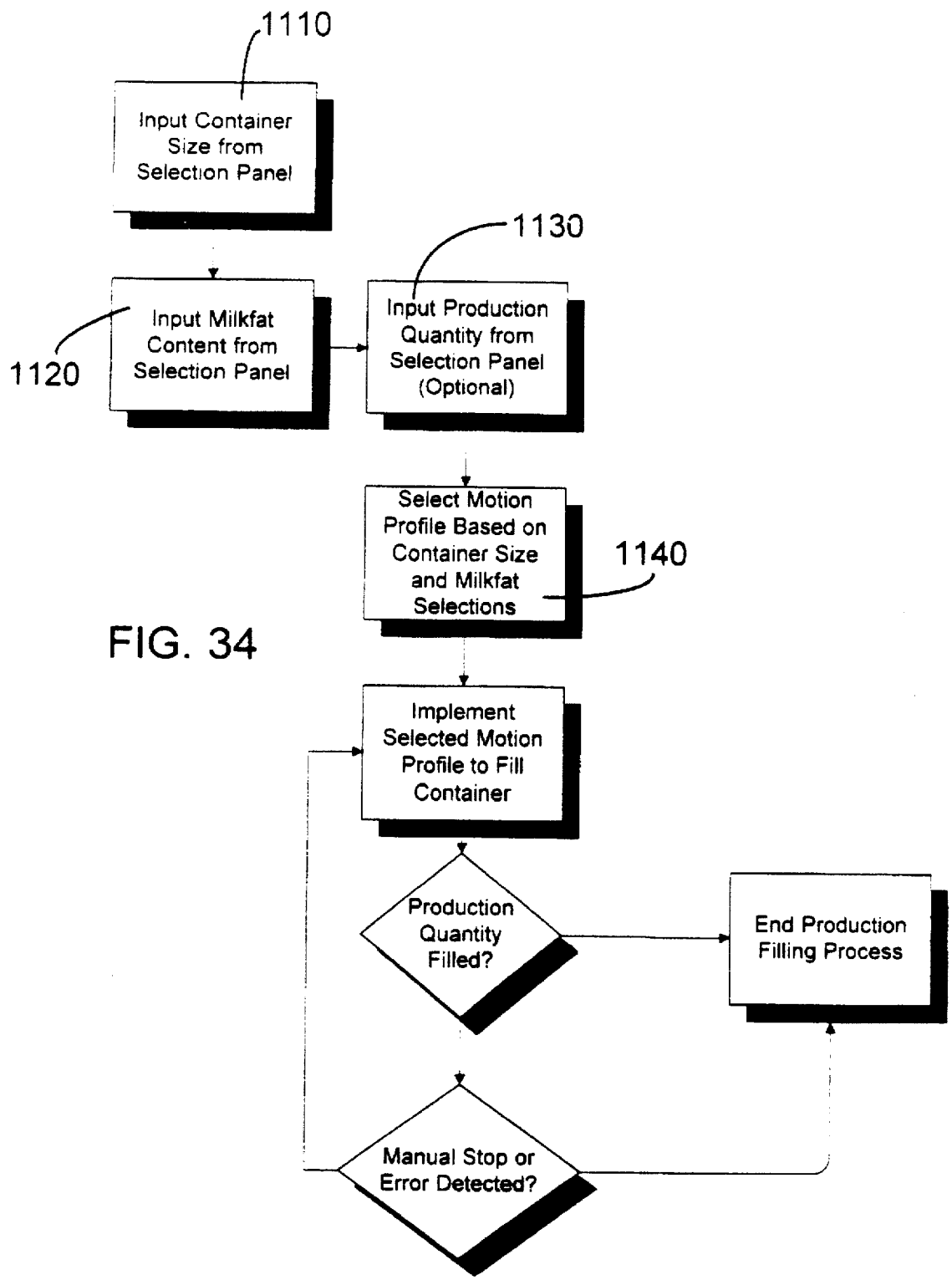
FIGS. 34–40 are flow diagrams that illustrate several ways in which the user interface and control system may operate.

The basic exemplary operation of the system is shown in FIG. 34 wherein the primary product is skim milk and the secondary product is cream. As illustrated, the user first selects the volume or size of the container that is to be fried at 1110. The milkfat content, such as skim, 1%, 2%, whole milk, or cream is then selected at 1120. The user may further optionally select the number of containers that are to be filled at 1130. Based on the volume and milkfat information that is input by the user, the control system automatically selects the proper motion profile at 1140, including the stroke length for the pistons of the primary and secondary pumps 355 and 350. The motion profiles are then continuously implemented to fill successive cartons until such time as the production quantity is filled, a manual stop is detected, or an error is detected.

Figure 35:
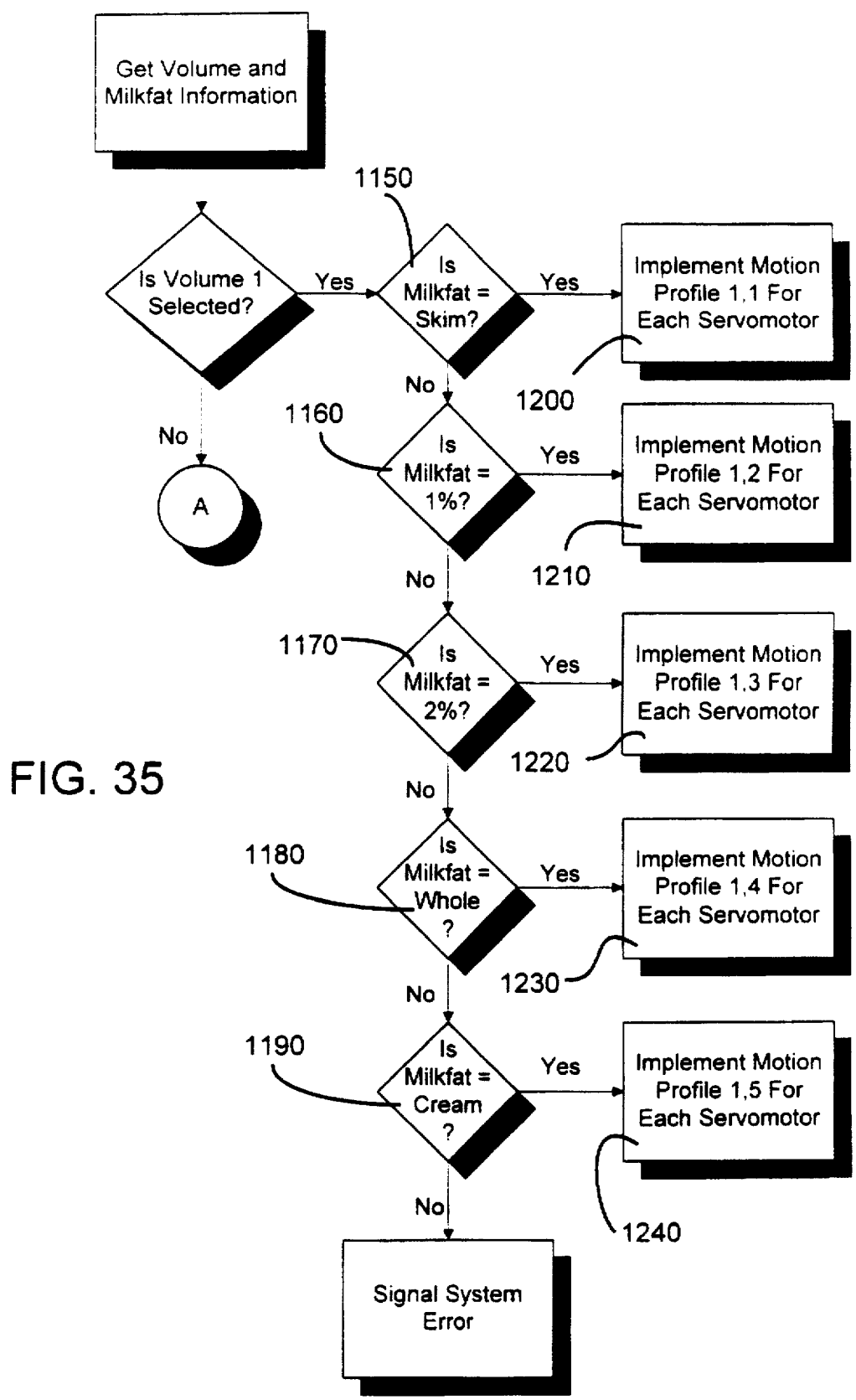
Figure 36:
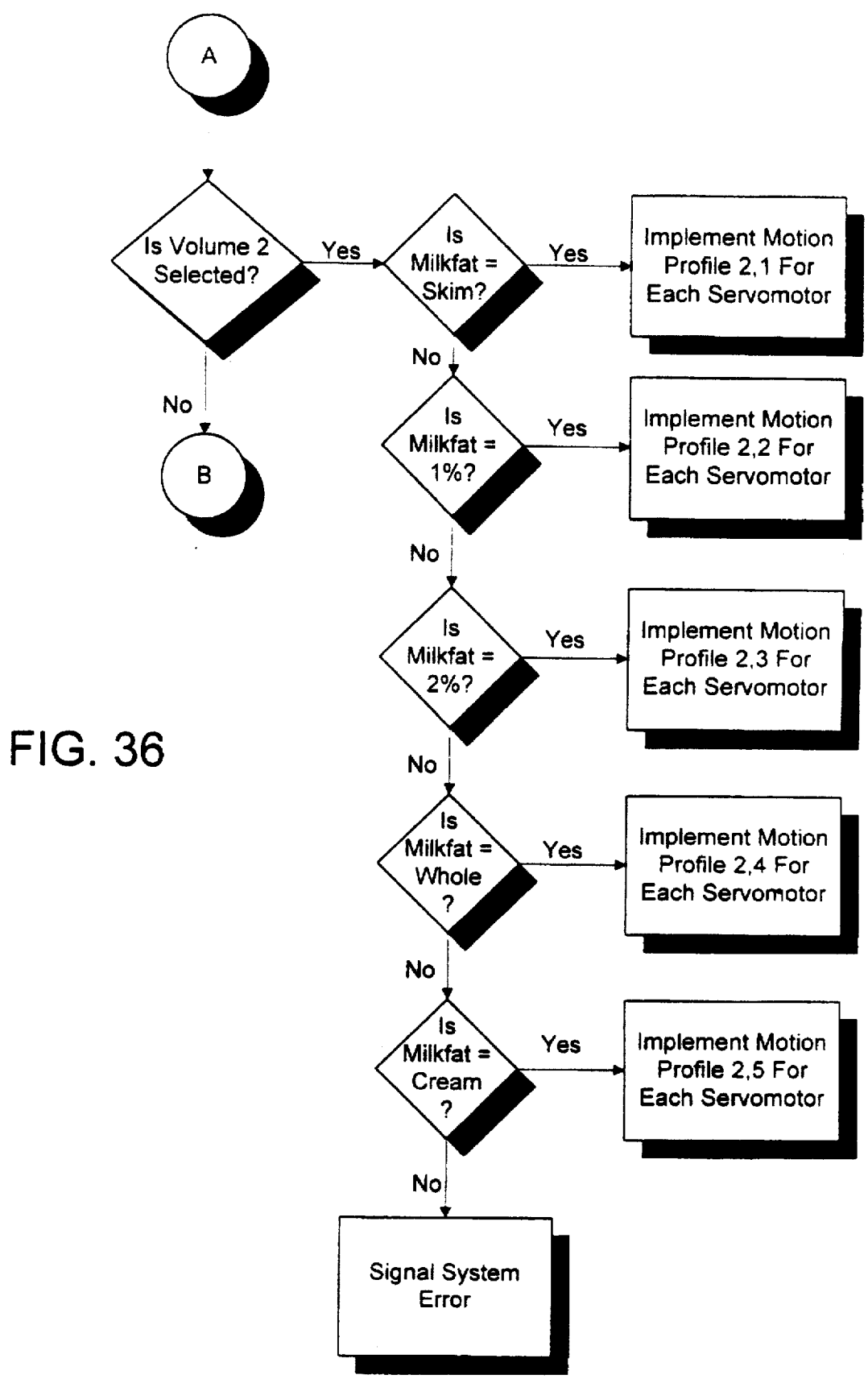
Figure 37:
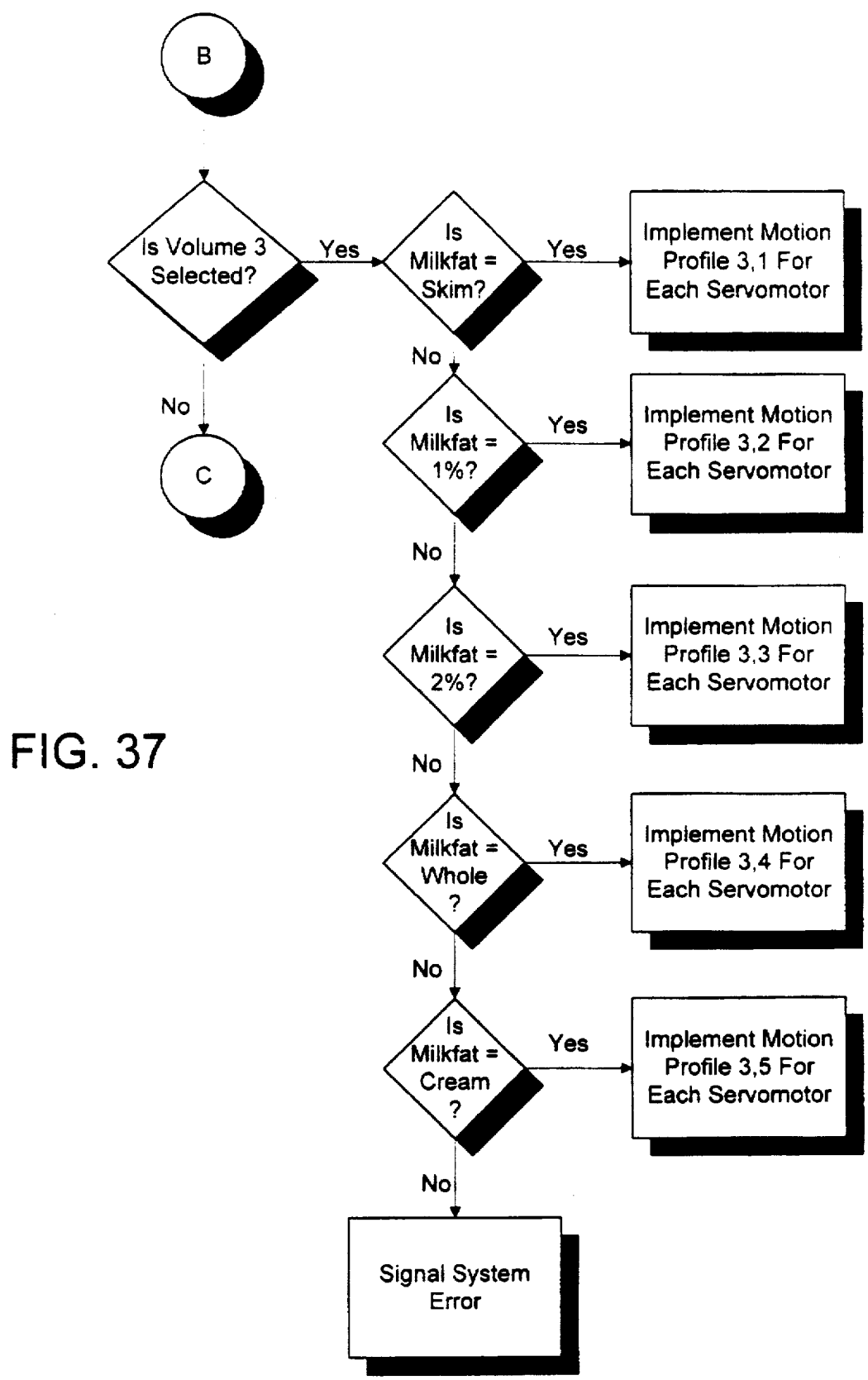
Figure 38:
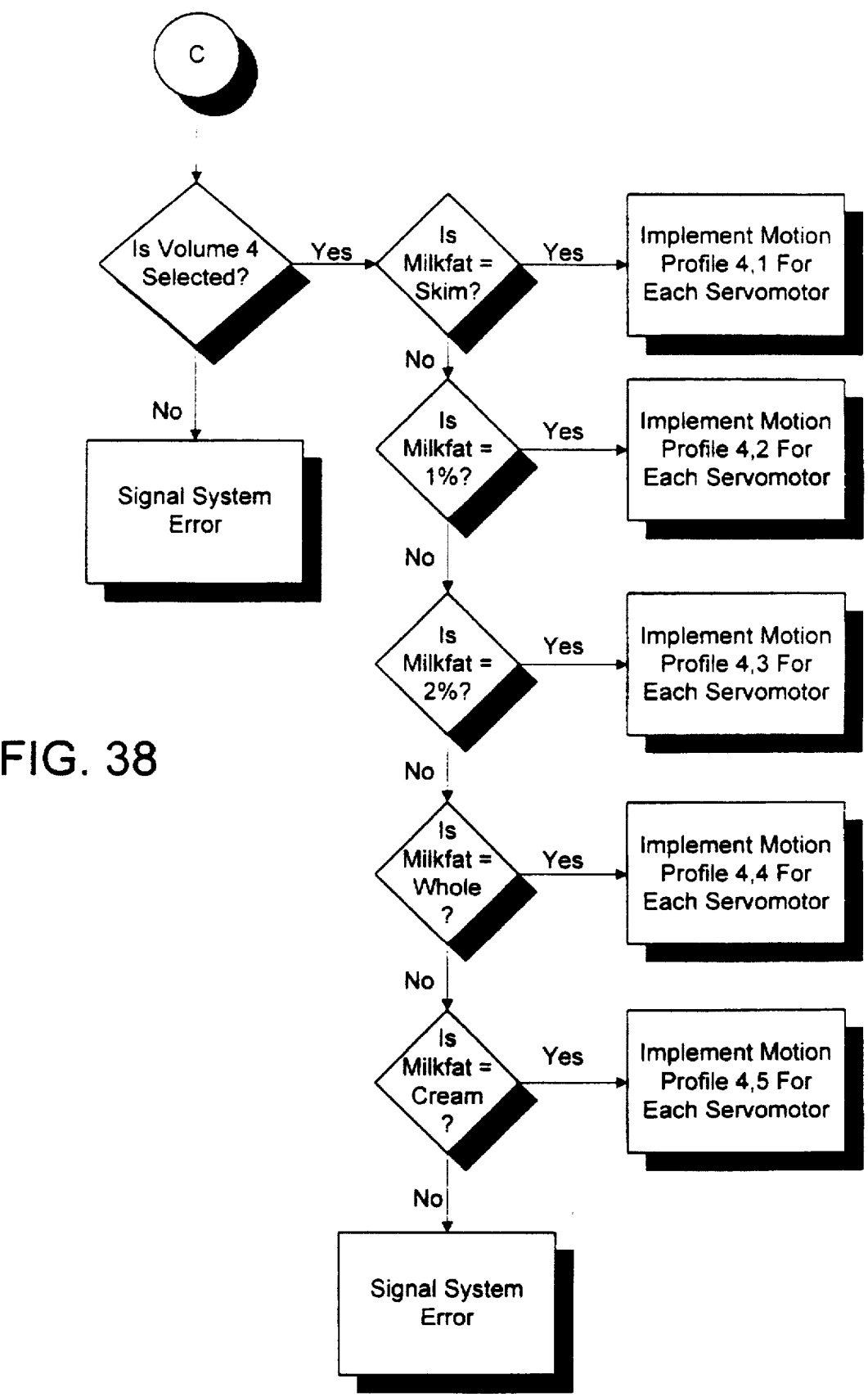

FIGS. 35–38 illustrate one method for selection of the motion profiles of the pistons based on the user inputs. In accordance with the illustrated method, motion profiles are stored, for example, in a read only memory (ROM). One motion profile is stored for each combination of volume and milkfat content that is selectable. For example, as illustrated in FIG. 35, if volume 1 (i.e., 1 gallon) is selected for the container volume, the system may then ascertain the selected milkfat concentration at steps 1150 through 1190. If the milkfat concentration that was selected falls within the proper range for acceptable inputs, the system selects and implements one of the proper motion profile at steps 1200 through 1240. A similar process ensues if one of the other container volumes has been selected.

Figure 39:
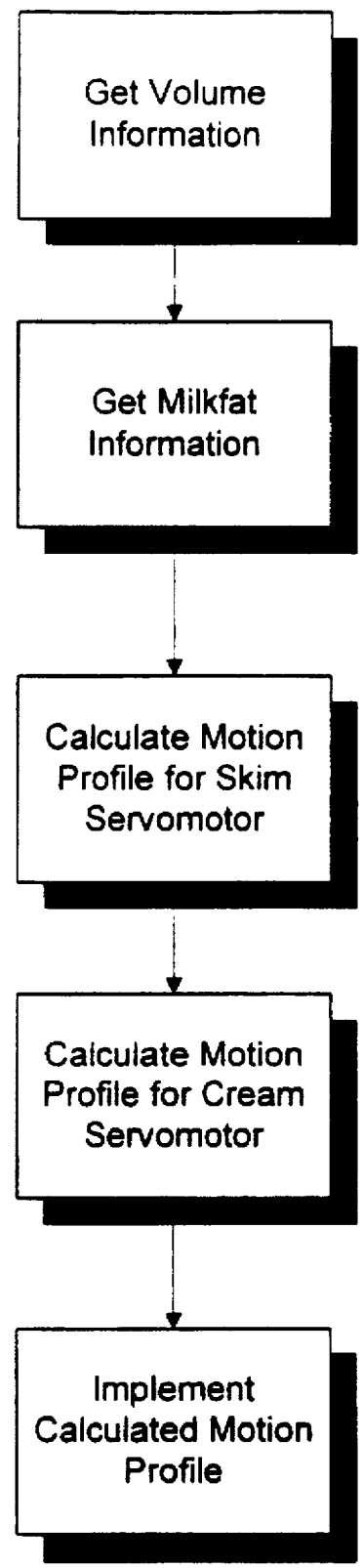

FIG. 39 illustrates another method for selection of the proper motion profile. Here, for example, a single motion profile may be stored in ROM or the like for each of the primary and secondary pumps 355 and 350. The motion profiles may then have their characteristics, such as the amplitude of the stroke length, altered based on the volume and milkfat concentration selected by the user.

Figure 26:
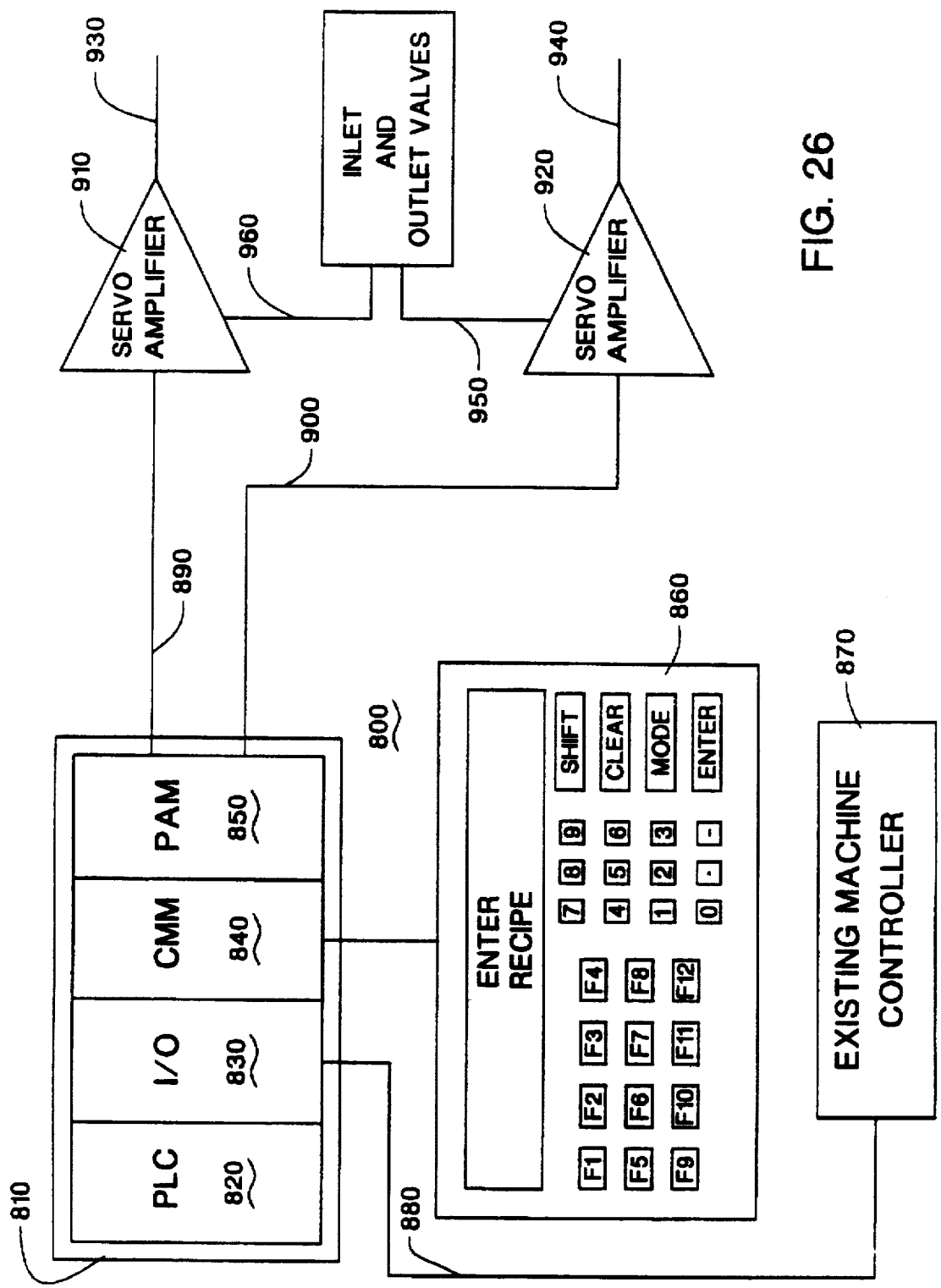
FIGS. 26–33 illustrate several embodiments of a user interface and control system suitable for use in the present invention.
Figure 40:
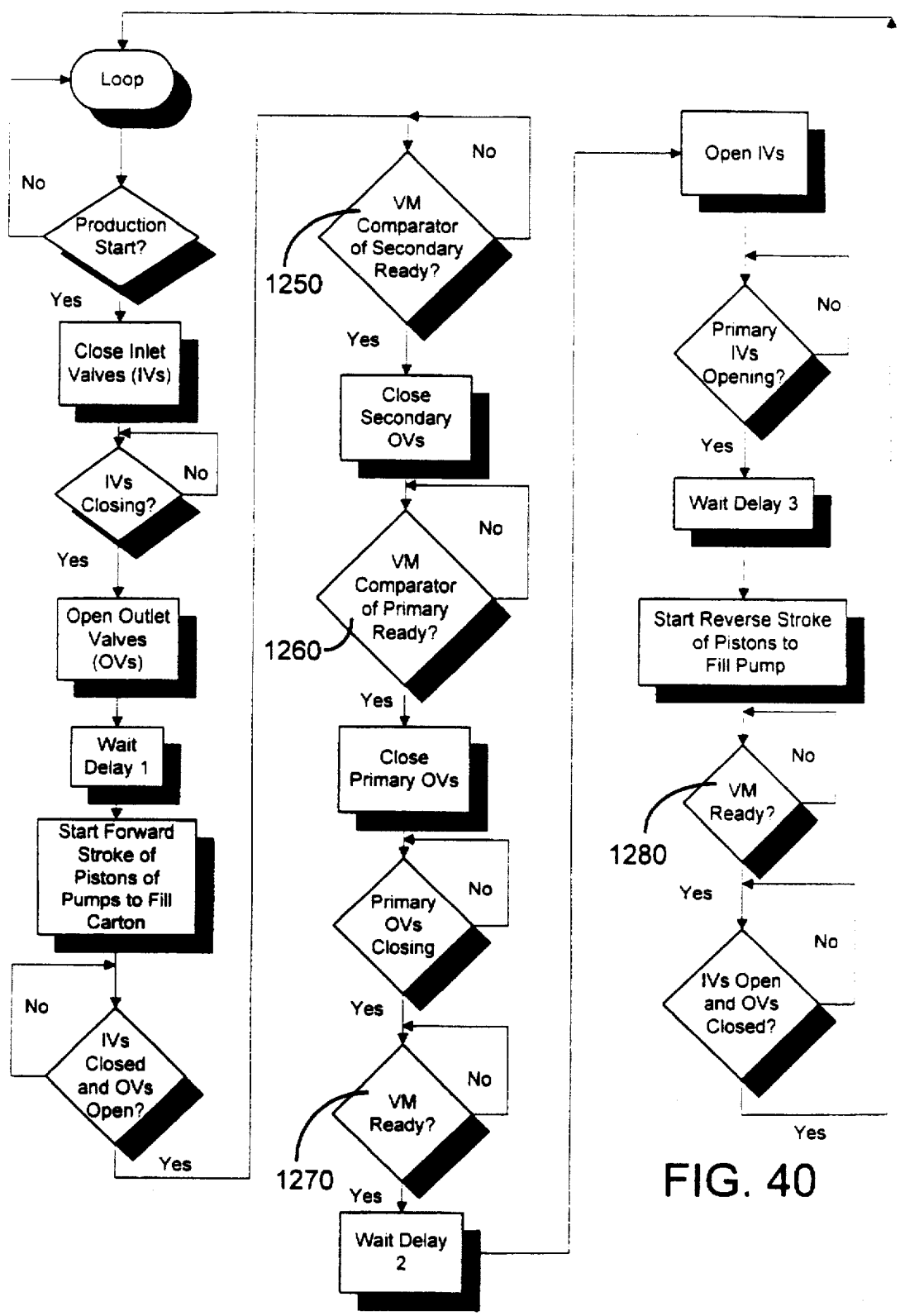

FIG. 40 illustrates one method for implementing the fill operation using, for example, the user interface and control system 800 shown in FIG. 26. This method may be implemented by the software utilized in the PAM that is, for example, a PAM available from Socapel. In the illustrated embodiment of the method, the inlet valves 132, 137, 155, and 160 and outlet valves 142, 147, and 215 as well as the pumps 350 and 355 are controlled by the PAM, servo amplifiers, and the associated servo motors 360 and 365. As would be understood by those skilled in machine controllers, the VM comparator referred to in steps 1250–1280 is the virtual master that is part of the PAM configuration.

Two different motion profiles are illustrated in FIG. 41 and 42 showing the dispensing of cream from the secondary pump 350 prior to the dispensing of skim from the primary pump 355. The illustrated profiles show piston position as a function of time over two cycle periods.

In FIG. 41, the pumps 350 and 355 are in a suction portion of the cycle up to time t1. From time t1 to time t2, both the primary and secondary pumps 355 and 350 are in a dwell period. At time t2, the secondary pump 350 exits the dwell period and begins the dispensing portion of its cycle while the primary pump 355 remains in the dwell portion of the cycle until time t3 at which point both skim milk and cream are in the process of being dispensed into the container. Dispensing is completed at t4 and a new cycle begins at t5. The delay period between t2 and t3 may, if desired, be programmable through the user interface. This delay may also be based on the amount of initial cream that is dispensed into the container.

In the alternative, or in addition to, the foregoing manner of dispensing cream before skim milk, the valve mechanisms 142, 147, and 215 may be used in a timed relationship to execute the desired fill timing and the delay period between skim milk and cream dispensing.

In FIG. 42, the pumps 350 and 355 are in a suction portion of the cycle up to time t1. From time t1 to time t2, both the primary and secondary pumps 355 and 350 are in a dwell period. At time t2, the secondary pump 350 exits the dwell period and begins the dispensing portion of its cycle while the primary pump 355 remains in the dwell portion of the cycle until time t3 at which point the cream has been completely, or close to completely dispensed into the container. At time t3, the primary pump 355 begins to dispense skim milk into the container. Dispensing is complete at time t4 and a new cycle begins at t5.

Figure 43:
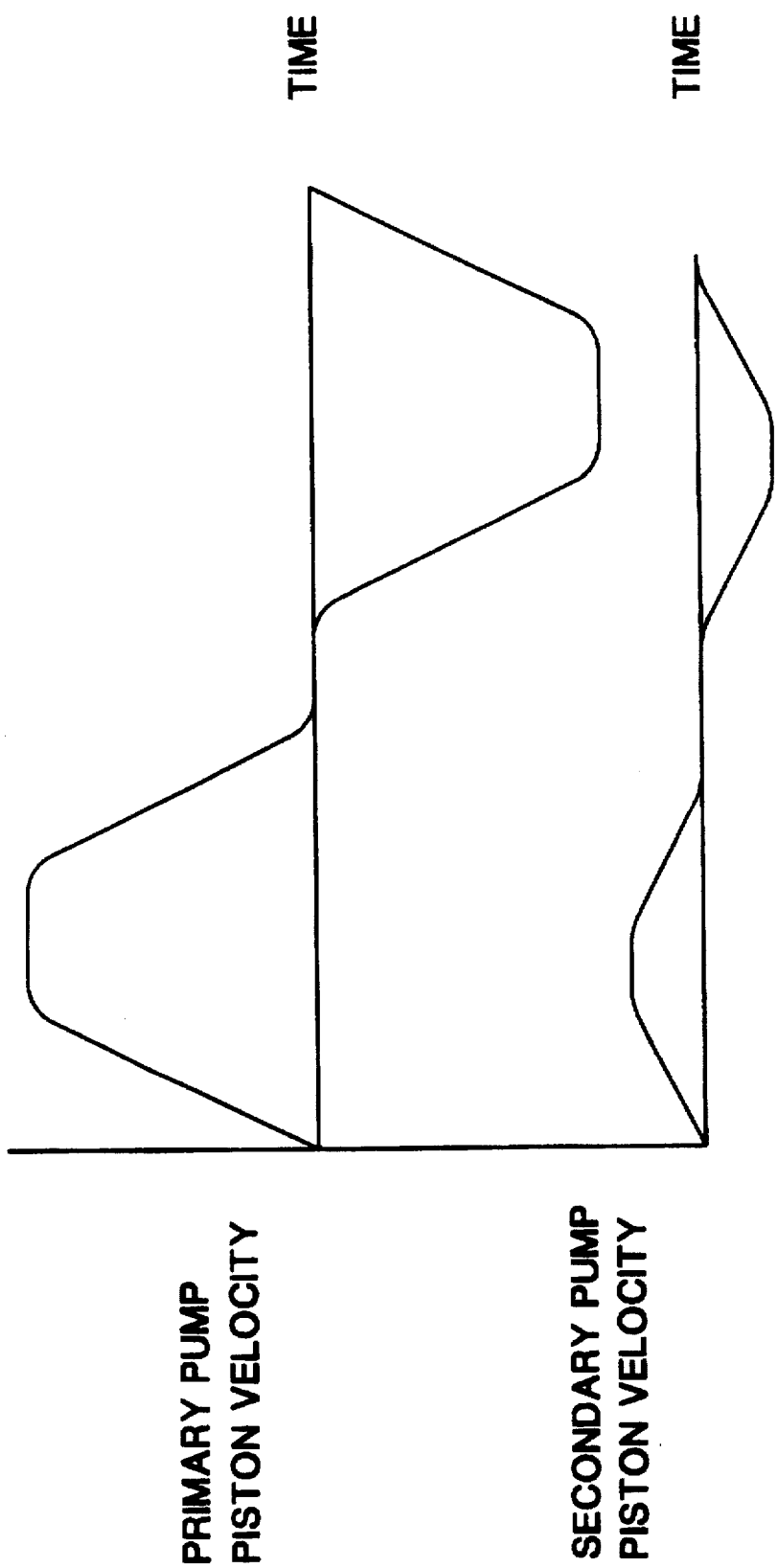
FIG. 43 is an exemplary velocity profile illustrating piston velocity as a function of time for each of the primary and secondary pumps.

FIG. 43 illustrates velocity of the pistons as a function of time over a single suction/dispensing cycle.

Figure 44:
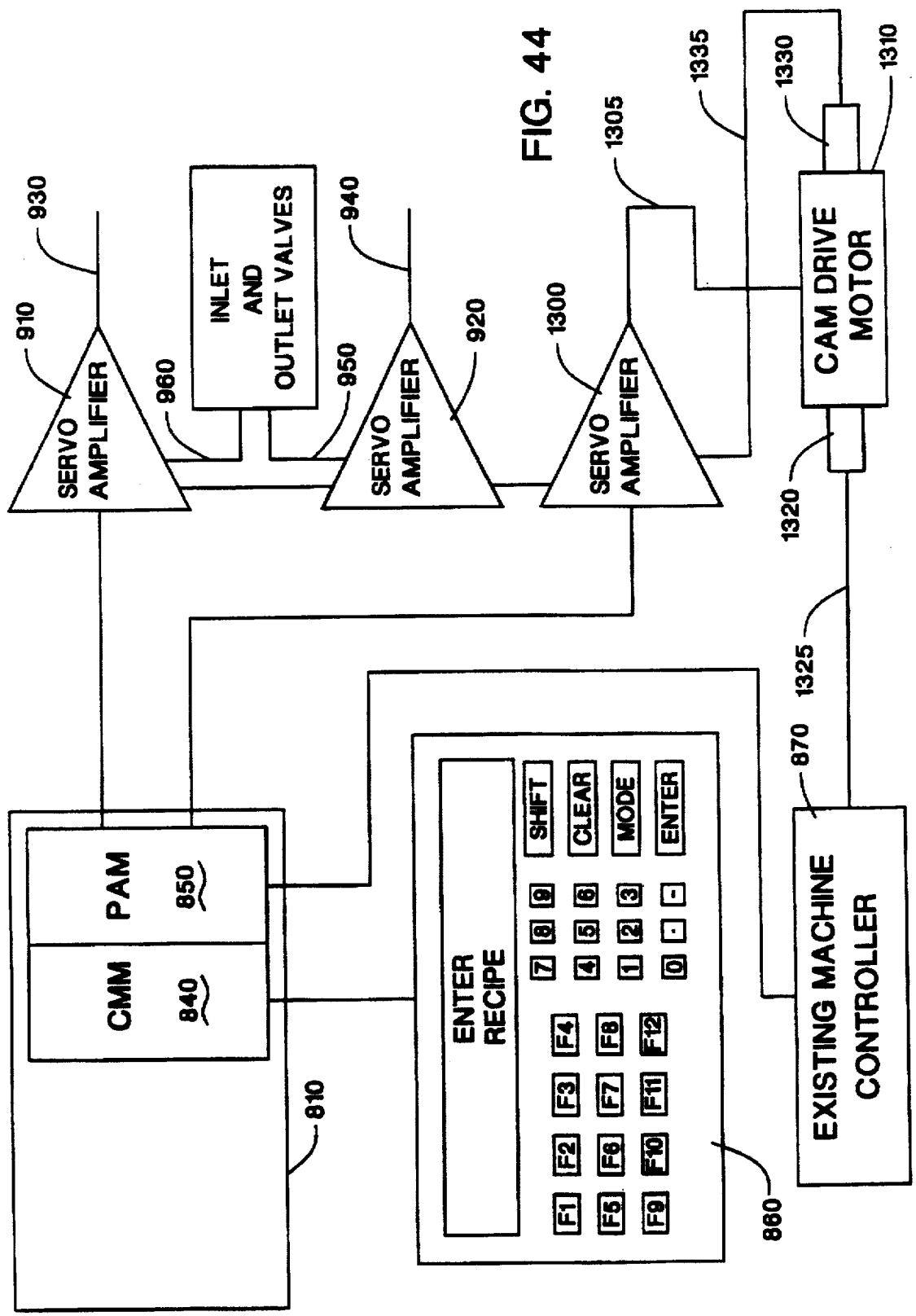
FIG. 44 illustrates a still further embodiment of a user interface and control system for use in the present fill system.

FIG. 44 illustrates a still further embodiment of a user interface and control system for use in an existing packaging machine such as the aforementioned TR/7 wherein further control circuitry is utilized to facilitate the use of existing machine components. In particular, the illustrated control system includes further circuitry for interfacing with the existing cam drive of the machine.

In accordance with known methods of changing the operation of a packaging machine to accommodate various carton volumes, a plurality of cams may be disposed about a single cam shaft extending along the length of the packaging machine. For a given package volume, only a single set of cams engage the various moving operational portions of the machine. When the package volume is changed by the user, the cam shaft is shifted along its axis until a further set of cams engage the moving operational portions of the machine. The further set of cams impart the motion required to operate the machine at the further selected carton volume.

In the illustrated system, the PAM 850 is directly connected to the existing machine controller 870. A further servo amplifier 1300, such as the aforementioned ST-1, is connected in a ring configuration with the previously noted servo amplifiers 910 and 920 shown in FIG. 26. The output of the servo amplifier 1300 is connected along one or more lines 1305 to drive a cam drive motor 1310 that, for example, may be a "dumb" motor that already exists in the machine to rotate the cam shaft. A first resolver 1320 is disposed to monitor the rotation of the cam shaft and report its position to the existing machine controller 870 along one or more lines 1325. A second resolver 1330 is disposed to monitor the rotation of the cam shaft and report its position to servo amplifier 1300 along one or more lines 1335. Since the servo amplifier controls the rotation of the cam shaft, it becomes possible to more accurately coordinate the operation of the existing machine with the newly added fill system.

While preferred embodiments of the invention have been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended. Therefore, all changes and modifications which come within the meaning and range of equivalency of the claims are intended to be embraced herein.

We claim:

1. A fill system in a packaging machine for filling a container with a primary and a secondary product, the fill system comprising:

primary pump means for pumping a predetermined amount of the primary product received at an inlet thereof to an outlet thereof;

a primary fill pipe connected to receive the predetermined amount of primary product from the outlet of the primary pump means, the primary fill pipe having an outlet overlying a container processing path along which the containers are filled and sealed by the packaging machine, the container processing path being generally perpendicular to the orientation of the primary fill pipe;

a nozzle connected at the outlet of the primary fill pipe;

secondary pump means for pumping a predetermined amount of the secondary product received at an inlet thereof to an outlet thereof;

a secondary fill pipe connected to receive the predetermined amount of secondary product from the outlet of the secondary pump means, the secondary fill pipe being concentrically disposed in the primary fill pipe and having an outlet overlying the container processing path; and valve means including a sealing member disposed at the outlet of the secondary fill pipe for controlling the flow of the secondary product from the secondary fill pipe, the valve means further comprising an actuator; and a valve rod disposed concentrically within the secondary fill pipe and connected to the actuator, the sealing member being disposed at an end of the valve rod proximate the outlet of the secondary fill pipe, the sealing member comprising a sealing ring engaging the valve rod at a flared section of the valve rod, and a nut connected to the valve rod, the nut including a flange engaging the sealing ring, the sealing ring being disposed between the flared section of the valve rod and the flange of the nut.

2. A fill system as claimed in claim 1 wherein the primary product is skim milk and the secondary product is cream.

3. A fill system as claimed in claim 2 wherein the valve means is actuated to begin dispensing cream into a container prior to the time that skim milk is dispensed by the primary pump means through the primary fill pipe and into the container thereby to dampen any foaming of the resulting milk mixture in the container.

4. A fill system as claimed in claim 3 wherein the dispensing of the predetermined amount of cream into the container is generally complete prior to the time that the skim milk begins to be dispensed into the container.

5. A fill system as claimed in claim 1 and further comprising an insulation pipe, the primary fill pipe being concentrically disposed within the insulation pipe and in close conformity therewith to provide a thin gaseous insulating layer between the insulation pipe and the primary fill pipe.

6. A fill system as claimed in claim 1 wherein a portion of the nozzle is disposed about the exterior perimeter of the primary fill pipe, the fill system further comprising an insulation pipe, the primary fill pipe being concentrically disposed within the insulation pipe and in close conformity therewith to provide a thin gaseous insulating layer between the insulation pipe and the primary fill pipe, the portion of the nozzle disposed about the exterior perimeter of the primary fill pipe forming a seal between the primary fill pipe and the insulation pipe.

7. A fall system as claimed in claim 1 wherein the valve rod comprises first and second flattened guide sections.

8. A fill system as claimed in claim 7 wherein the first and second flattened guide sections are disposed orthogonal to one another.

9. A fill system as claimed in claim 1 wherein the primary pump means comprises:

an inlet pipe connected to receive the primary product at an inlet thereof;

a first valve disposed at the output of the inlet pipe;

a primary pump mechanism having an inlet connected to receive the primary product from the first valve; and a second valve disposed at the outlet of the primary pump mechanism and controlling the flow of the primary product to the primary fill pipe.

10. A fill system as claimed in claim 9 wherein the primary pump mechanism comprises:

a pump having a piston, the length of the stroke of the piston determining the predetermined amount of the primary product dispensed; and a servomotor connected to control the length of the stroke of the piston.

11. A fill system as claimed in claim 9 wherein the secondary pump means comprises:

a secondary inlet pipe connected to receive the secondary product at an inlet thereof;

a secondary valve disposed at the output of the inlet pipe; and a secondary pump mechanism having an inlet connected to receive the secondary product from the valve, the secondary pump mechanism having an outlet connected to supply the secondary product to the secondary fill pipe.

12. A fill system as claimed in claim 11 wherein the secondary pump mechanism comprises:

a pump having a piston, the length of the stroke of the piston determining the predetermined amount of the secondary product dispensed; and a servomotor connected to control the length of the stroke of the piston.

13. A fill system as claimed in claim 1 and further comprising a cleaning sleeve disposed about the primary fill pipe.

14. A fill system as claimed in claim 13 and further comprising a cleaning cover for sealing an end of the cleaning sleeve proximate the nozzle.

15. A fill system as claimed in claim 14 wherein the nozzle is formed from a generally flexible material.

16. A fill system as claimed in claim 15 wherein the cleaning cover comprises a plurality of arcuate reservoirs joined together at a portion of the cleaning cover disposed below a central portion of the nozzle.

17. A fill system in a packaging machine for filling a container with a primary and a secondary product, the fill system comprising:

a primary fill pipe connected to receive the primary product, the primary fill pipe having an outlet overlying a container processing path along which the containers are filled and sealed by the packaging machine, the container processing path being generally perpendicular to the orientation of the primary fill pipe;

a nozzle connected at the outlet of the primary fill pipe;

a secondary fill pipe connected to receive the secondary product, the secondary fill pipe being concentrically disposed in the primary fill pipe and having an outlet overlying the container processing path; and a valve mechanism including a sealing member disposed at the outlet of the secondary fill pipe for controlling the flow of the secondary product from the secondary fill pipe the valve means comprising an actuator; and a valve rod disposed concentrically within the secondary fill pipe and connected to the actuator, the sealing member being disposed at an end of the valve rod proximate the outlet of the secondary fill pipe, the sealing member comprising a sealing ring engaging the valve rod at a flared section of the valve rod, and a nut connected to the valve rod, the nut including a flange engaging the sealing ring, the sealing ring being disposed between the flared section of the valve rod and the flange of the nut.

18. A fill system as claimed in claim 17 wherein the primary product is skim milk and the secondary product is cream.

19. A fill system as claimed in claim 17 and further comprising an insulation pipe, the primary fill pipe being concentrically disposed within the insulation pipe and in close conformity therewith to provide a thin gaseous insulating layer between the insulation pipe and the primary fill pipe.

20. A fill system as claimed in claim 17 wherein a portion of the nozzle is disposed about the exterior perimeter of the primary fill pipe, the fill system further comprising an insulation pipe, the primary fill pipe being concentrically disposed within the insulation pipe and in close conformity therewith to provide a thin gaseous insulating layer between the insulation pipe and the primary fill pipe, the portion of the nozzle disposed about the exterior perimeter of the primary fill pipe forming a seal between the primary fill pipe and the insulation pipe.

21. A fill system as claimed in claim 17 wherein the valve rod comprises first and second flattened guide sections.

22. A fill system as claimed in claim 21 wherein the first and second flattened guide sections are disposed orthogonal to one another.

23. A fill system as claimed in claim 17 and further comprising a cleaning sleeve disposed about the primary fill pipe.

24. A fill system as claimed in claim 23 and further comprising a cleaning cover for sealing an end of the cleaning sleeve proximate the nozzle.

25. A fill system as claimed in claim 24 wherein the nozzle is formed from a generally flexible material.

26. A fill system as claimed in claim 25 wherein the cleaning cover comprises a plurality of arcuate reservoirs joined together at a portion of the cleaning cover disposed below a central portion of the nozzle.

27. A fill system in a packaging machine for filling a container with milk having a user specified milkfat content, the fill system comprising:

user interface means for allowing a user to specify the milkfat content of the milk;

a primary pump having a piston, the length of the stroke of the piston determining the amount of skim milk dispensed into the container, the primary pump having an inlet receiving the skim milk and an outlet;

a primary fill pipe connected to receive the skim milk from the outlet of the primary pump, the primary fill pipe having an outlet overlying a container processing path along which the containers are filled and sealed by the packaging machine;

a secondary pump having a piston, the length of the stroke of the piston determining the amount of cream dispensed into the container, the primary pump having an inlet receiving the cream and an outlet;

a secondary fill pipe connected to receive the cream from the outlet of the secondary pump, the secondary fill pipe being concentrically disposed in the primary fill pipe and having an outlet overlying the container processing path; and control means accepting the milkfat content specified by the user at the user interface means for controlling the length of the stroke of the primary pump to dispense a predetermine amount of skim milk into the container and for controlling the length of the stroke of the secondary pump to dispense a predetermined amount of cream into the container.

28. A fill system as claimed in claim 22 wherein the control means comprises:

a first servomotor connected to actuate the piston of the primary pump;

a first servo amplifier connected to control actuation of the first servomotor;

a second servomotor connected to actuate the piston of the secondary pump;

a second servo amplifier connected to control actuation of the second servomotor; and a PAM connected to send positional instructions to the first and second servo amplifiers based on the milkfat content selected by the user.

29. A fill system as claimed in claim 27 wherein the interface means comprises:

a display;

a plurality of keys for actuation by the user to facilitate user selection of the milkfat content of the milk dispensed into the containers; and a processor for sending user prompt information to the display.

30. A fill system as claimed in claim 27 wherein the interface means comprises:

a display;

a plurality of keys for actuation by the user to facilitate user selection of the milkfat content of the milk dispensed into the containers; and a processor for sending user prompt information to the display and accepting key presses of the plurality of keys by the user for selection of the milkfat content of the milk dispensed into the containers, the processor connected to send signals to the PAM thereby facilitating actuation of the first and second servomotors.

31. A fill system as claimed in claim 27 wherein the interface means comprises a plurality of keys for actuation by the user to facilitate user selection of the milkfat content of the milk dispensed into the containers.

32. A fill system as claimed in claim 27 and further comprising:

a first valve mechanism disposed to control the flow of skim milk from the primary fill pipe; and a second valve mechanism disposed to control the flow of cream from the secondary fill pipe.

33. A fill system as claimed in claim 32 wherein the control means is further connected to actuate the first and second valve mechanisms, the control means actuating the second valve mechanism to begin dispensing cream into the container prior to the time that the first valve mechanism is actuated to begin dispensing skim milk from the primary fill pipe and into the container thereby to dampen any foaming of the resulting milk mixture in the container.

34. A fill system as claimed in claim 33 wherein the control means actuates the first and second valves so that the dispensing of the predetermined amount of cream into the container is generally complete prior to the time that the skim milk begins to be dispensed into the container.

* * * * *